United States Patent
Kashibuchi

(10) Patent No.: US 10,296,559 B2
(45) Date of Patent: May 21, 2019

(54) DISPLAY APPARATUS, CONTROL METHOD THEREFOR, AND STORAGE MEDIUM

(71) Applicant: CANON KABUSHIKI KAISHA, Tokyo (JP)

(72) Inventor: Yoichi Kashibuchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1010 days.

(21) Appl. No.: 14/101,602

(22) Filed: Dec. 10, 2013

(65) Prior Publication Data

US 2014/0173394 A1    Jun. 19, 2014

(30) Foreign Application Priority Data

Dec. 18, 2012 (JP) .................................. 2012-276168

(51) Int. Cl.
G06F 17/21 (2006.01)

(52) U.S. Cl.
CPC .................................. *G06F 17/211* (2013.01)

(58) Field of Classification Search
CPC .................................................. G06F 17/211
USPC ......................................................... 715/201
See application file for complete search history.

(56) References Cited

U.S. PATENT DOCUMENTS

| 8,023,738 B1 * | 9/2011 | Goodwin | G06K 9/00469 382/175 |
| 8,331,731 B2 | 12/2012 | Kashibuchi | |
| 8,539,342 B1 * | 9/2013 | Lewis | G06F 17/212 715/243 |
| 8,711,433 B2 | 4/2014 | Kashibuchi et al. | |
| 8,830,241 B1 * | 9/2014 | Gorner | G06K 9/34 345/467 |
| 9,349,202 B1 * | 5/2016 | Manohar | G06T 11/60 |
| 2003/0014445 A1 * | 1/2003 | Formanek | G06F 17/211 715/247 |
| 2003/0135649 A1 * | 7/2003 | Buckley | G06F 3/1454 709/247 |
| 2004/0103371 A1 * | 5/2004 | Chen | G06F 17/30905 715/205 |
| 2004/0146199 A1 * | 7/2004 | Berkner | G06T 11/60 382/176 |
| 2004/0202352 A1 * | 10/2004 | Jones | G06F 17/211 382/114 |
| 2004/0205568 A1 * | 10/2004 | Breuel | G06F 17/211 715/205 |
| 2006/0195784 A1 * | 8/2006 | Koivisto | G06F 17/212 715/234 |

(Continued)

FOREIGN PATENT DOCUMENTS

JP     2004-110411 A     4/2004

*Primary Examiner* — Frank D Mills
(74) *Attorney, Agent, or Firm* — Venable LLP

(57) ABSTRACT

When a reduction instruction is given to characters contained in a character region displayed in a wrapped-display mode, the display apparatus of the present invention determines whether or not the width of the reduction-instructed character region to which the reduction instruction has been made is equal to or less than the width of the screen. When the display apparatus determines that the width of the reduction-instructed character region is equal to or less than the width of the screen, the display apparatus controls to switch the wrapped-display mode to the partial region display mode.

8 Claims, 35 Drawing Sheets

(56) References Cited

U.S. PATENT DOCUMENTS

| | | | | |
|---|---|---|---|---|
| 2006/0227153 | A1* | 10/2006 | Anwar | G06T 3/0012 345/660 |
| 2007/0130525 | A1* | 6/2007 | Murphy | G06F 17/30905 715/747 |
| 2007/0234203 | A1* | 10/2007 | Shagam | G06F 17/211 715/210 |
| 2007/0237428 | A1* | 10/2007 | Goodwin | G06K 9/00442 382/309 |
| 2008/0094368 | A1* | 4/2008 | Ording | G06F 3/0488 345/173 |
| 2008/0285090 | A1* | 11/2008 | Stumbo | G06F 3/147 358/473 |
| 2009/0089448 | A1* | 4/2009 | Sze | G06F 9/4443 709/231 |
| 2009/0109243 | A1* | 4/2009 | Kraft | G06F 3/0481 345/660 |
| 2009/0193337 | A1* | 7/2009 | Carter | G06F 3/0481 715/277 |
| 2009/0319888 | A1* | 12/2009 | Oygard | G06F 17/211 715/252 |
| 2010/0005387 | A1* | 1/2010 | Toki | G06F 3/0481 715/246 |
| 2010/0029340 | A1* | 2/2010 | Klassen | G06F 17/30905 455/566 |
| 2010/0156806 | A1* | 6/2010 | Stallings | G06F 3/04883 345/173 |
| 2010/0199195 | A1* | 8/2010 | Carounanidy | G06F 17/30905 715/760 |
| 2011/0035702 | A1* | 2/2011 | Williams | G06F 3/0481 715/800 |
| 2011/0161806 | A1* | 6/2011 | Stern | G06F 17/211 715/247 |
| 2012/0096344 | A1* | 4/2012 | Ho | G06F 17/211 715/249 |
| 2012/0137200 | A1* | 5/2012 | Shar | G06F 17/30643 715/202 |
| 2012/0297335 | A1* | 11/2012 | Ramasubramanian | G06F 3/04855 715/787 |
| 2012/0311487 | A1* | 12/2012 | Staikos | G06F 3/048 715/800 |
| 2013/0007602 | A1* | 1/2013 | Dougherty | G06T 11/60 715/251 |
| 2013/0055077 | A1* | 2/2013 | Hagel-Sorensen | G06F 17/212 715/273 |
| 2013/0205202 | A1* | 8/2013 | Xiao | G06F 17/2264 715/249 |
| 2013/0259377 | A1* | 10/2013 | Goktekin | G06T 3/0056 382/176 |
| 2013/0346913 | A1* | 12/2013 | Smith | G06F 3/0485 715/784 |
| 2014/0006982 | A1* | 1/2014 | Wabyick | G06F 17/212 715/763 |
| 2014/0179287 | A1* | 6/2014 | Liang | H04W 4/18 455/414.4 |
| 2014/0289614 | A1* | 9/2014 | Ayers | G06F 17/211 715/247 |

* cited by examiner

FIG. 8

Block information

|  | Attribute | X-Coordinate | Y-Coordinate | Width W | Height H | OCR Information |
|---|---|---|---|---|---|---|
| Block 1 | 1 | X1 | Y1 | W1 | H1 | Present |
| Block 2 | 3 | X2 | Y2 | W2 | H2 | Present |
| Block 3 | 2 | X3 | Y3 | W3 | H3 | Absent |
| Block 4 | 1 | X4 | Y4 | W4 | H4 | Present |
| Block 5 | 3 | X5 | Y5 | W5 | H5 | Present |
| Block 6 | 2 | X6 | Y6 | W6 | H6 | Absent |

* Attribute 1: Character, 2: Photograph, 3: Graphic

Input file information

| Total number of blocks | N (=6) |
|---|---|

FIG. 18A

```
<?xml version="1.0"?>
<svg:svg xmlns:svg="http://www.w3.org/2000/svg" xmlns:xlink="http://www.w3.org/1999/xlink" xmlns:rcd
="http://www.ddd.com/ns/rcd" width="606" height="862" viewBox="0 0 2361 3388">
```
— 1801

```
<svg:image  x="0" y="0" width="1240" height="1760"
xlink:href="data:image/jpeg;base64,/9j/2wCEAB8VFxsXEx8bGRsjIR8kLk0yLioqLI5DRzhNb2J1c21ibGp7irGWe4OnhGpsmtGcp7a8
xsjGd5TZ6NfA5rHCxr4BlSMjLiguWjIyWr5/bH+++vr6+vr6+vr6+vr6+vr6+vr6+vr6+vr6+vr6+vr6+vr6+vr6+
FFABRQB//ZAAA="/>
</svg:image>
```

— 1802

```
<svg:svg x="188" y="284" width="896" height="148" rcd:gType="vectorText">
  <svg:g fill="#020202">
    <path d="  M123.3,779h1.2c2.4,0 10.7,3.1 10.7,4h12h1.4q1.4,0 3.8,-1q2.4,-1 8.6,-4h1c3.5,0 8,2.8 8,5
    v2q-14.2 -20.2v3q0.3 2.6.6v2.4h2q2.0 6.9,-1.5q5,-1.5 12.1,-4.5h0.5c3.3,0 9.5,3.3 9.5,5
    c0,0.8 -23.6,6 -27,6h-1v3q7.22 7.23c0,0.8 -3.2,4 -4,4c-3.1,0 -4.9,-3.4 6.8,-12.3c-1.4,-7 -2,-9.4 -3,-11.7
    q-0.2,-0.4 -0.2,-0.7v-2.4h-2q-2,0 -7.5,2.3q-5.5,2.2 -13.5,7c-3.2,0 -9.5,-6.7 -9.5,-10v-2h3
    q3.1,2.4 4.1,3.2q0.9,0.8 1.9,0.8c4,0 21,-5.7 21,-7q-2,-5 -2,-9v-1h-3q-3,0 -6.1,1.3q-3.2,1.3 -8.9,3.7
    h-0.5c-3.4,0 -9.5,-5.1 -9.5,-8c0,-1 1.3,-3 2,-3q3,3 5,3h4q10,-2 14,-2v-2.5c0,-3.8 -3.8,-10.5 -6,-10.5
    h-3v-1.5c0,-0.3 3,-3.5 3.3 -3.5z"/>
    <path d="M199,781h1c2.4,0 9,6.2,2 9.6,3v15h3.2q3.2,0 11.1,-2q7.8,-2 16.1,-5c2.2,0 8.5,8 8,8v2
    h-5q0,0 0,0c-1,2.7 -23,2,18 -26,18h-1v2.5q5,18.5 5,21v0.5c0,1.2 -2,1.4 -3.4c-4.1,0 -5.2,-1.9 -6.8,-12.8
    c-2.1,-14.2 -3.6,-22.2 -5,-26.2q-0.2,-0.4 -0.2,-0.7v-2.4h-1.5q-1.5,0 -7.6,2.3q-6.2,2.3 -10.9,4.7c-2.9,0 -8,-6.1 -8,-9.5
    v-2.5h2q3.1,2.4 4.1,3.2q0.9,0.8 1.9,0.8q12,-3 18,-3v-3c0,-6.7 -3.4,-13 -7,-13h-2v-2
    c0,-1 2.7,-3 4,-3m34,19c-4,0 -21,4.9 -21,6q,2.6 2,11h1.5c1.9,0 17.5,-14.2 17.5,-16v-1z"/>
    ...
  </svg:g>
```

— 1803

```
  <svg:text fill="#020202" font-size="150">
    <svg:tspan y="144" x="0 149 299 449 609 750">DDD TARO</svg:tspan>
  </svg:text>
</svg:svg>
```

FIG. 21A

| Event name | Touch press event |
|---|---|
| Transmitted information | Press coordinate values |
| | Latest coordinate values |

FIG. 21B

| Event name | Swipe event |
|---|---|
| Transmitted information | Event generation coordinate values |
| | Moving distance |

FIG. 21C

| Event name | Pinch-in event |
|---|---|
| Transmitted information | Pinch-in center coordinate values |
| | Pinch-in reduction rate |

FIG. 21D

| Event name | Pinch-out event |
|---|---|
| Transmitted information | Pinch-out center coordinate values |
| | Pinch-out enlargement rate |

FIG. 21E

| Event name | 2-point swipe event |
|---|---|
| Transmitted information | Event generation coordinate values |
| | Moving distance |

FIG. 21F

| Event name | Rotate event |
|---|---|
| Transmitted information | Rotation center coordinate values |
| | Rotational angle |

FIG. 21G

| Event name | Flick event |
|---|---|
| Transmitted information | Latest coordinate values |
| | Released speed |

FIG. 21H

| Event name | Touch release event |
|---|---|
| Transmitted information | Releasing coordinate values |
| | Latest number of coordinates |

FIG. 21I

| Event name | Double-tap event |
|---|---|
| Transmitted information | Latest coordinate values |

FIG. 21J

| Event name | Single-tap event |
|---|---|
| Transmitted information | Latest coordinate values |

FIG. 21K

| Event name | Long-tap event |
|---|---|
| Transmitted information | Latest coordinate values |

FIG. 21L

| Event name | Touch-and-hold event |
|---|---|
| Transmitted information | Latest coordinate values |

DISPLAY APPARATUS, CONTROL METHOD THEREFOR, AND STORAGE MEDIUM

BACKGROUND OF THE INVENTION

Field of the Invention

The present invention relates to a display apparatus, a control method therefor, and a storage medium.

Description of the Related Art

There has been proposed a method for displaying a document which is digitalized by using an information processing apparatus such as a mobile terminal or a tablet as image data. However, the entire image data (page image) for a page is displayed on such an apparatus provided with a small display screen, resulting in deterioration in visibility of characters. An image display apparatus that enlarges and displays a partial region of a page image in response to an operation on a screen is contemplated. However, the range of characters, in a typesetting direction, contained in an object in the enlarged-displayed region may be outside the screen. For example, in the case of characters of which the typesetting direction is horizontal, the user must perform a scroll operation in two directions of horizontal and vertical directions on a screen in order to read characters if a part of characters contained in one column is outside the screen.

Accordingly, for example, there has been proposed a display method for analyzing a layout of a page image, recognizing a text block contained in the page image, and displaying, by word wrap processing, characters contained in the text block according to the width (or the height) of a display region of a display screen. Japanese Patent Laid-Open No. 2004-110411 discloses a display apparatus that displays a wrapped image in which characters have been wrapped such that characters contained in the text block fit into the width (or the height) of a display region by the pressing of a button displayed on the display region by a user.

According to the method, even when characters are wrapped and displayed as a result of enlargement by the pressing of a button, characters in a text block can be read if a display image is scrolled only in one direction (i.e., vertical direction with respect to a horizontal writing text or horizontal direction with respect to a vertical writing text).

In the display apparatus disclosed in Japanese Patent Laid-Open No. 2004-110411, however, the user must provide an explicit instruction to switch the display between a reduced image and a wrapped image through the pressing of the button on the display region. Thus, the user needs to perform a complex operation in order to read a document by going back and forth between two images.

Furthermore, even when a reduced image and a wrapped image are simultaneously displayed on a display region, a reduced image with a sufficient size to be viewed cannot be obtained in an image display apparatus only having a small display region.

SUMMARY OF THE INVENTION

The display apparatus of the present invention displays an object contained in a page image in a mode according to the contents of an operation made on a screen, so that a user can read characters contained in the displayed object in a simple operation.

According to an aspect of the present invention, a display apparatus is provided that includes a display unit configured to display a page image in any one display mode of a page image display mode suitable for displaying the entire page image, a partial region display mode suitable for displaying a character region by aligning the width of the character region in the page image with the width of a screen, and a wrapped-display mode for enlarging and displaying characters contained in the character region by wrapping them; a first determination unit configured to, when a reduction instruction is given to characters contained in a character region displayed in the wrapped-display mode, determine whether or not the width of the reduction-instructed character region in response to the reduction instruction is equal to or less than the width of the screen; and a control unit configured to control to, when the first determination unit determines that the width of the reduction-instructed character region is equal to or less than the width of the screen, switch the wrapped-display mode to the partial region display mode.

According to the present invention, the display apparatus that displays an object contained in a page image in a mode according to the contents of an operation made on a screen may be provided, so that a user can read characters contained in the displayed object in a simple operation. In addition, when the size of an object having the "character" attribute does not fit into the screen with respect to the typesetting direction of characters, the display apparatus automatically switches the display mode to the wrapped-display mode for allowing a user to read characters by the movement operation in only one direction, so that the user can maintain the operation in one direction without user awareness.

Further features of the present invention will become apparent from the following description of exemplary embodiments with reference to the attached renderings.

BRIEF DESCRIPTION OF THE DRAWINGS

FIG. 8 illustrates block information and input file information on each attribute when object segmentation is performed.

FIG. 18A and FIG. 18B illustrate examples of the Scalable Vector Graphics (SVG) format.

FIGS. 21A to 21L illustrate names of gesture events and information to be transmitted when each event occurs.

DESCRIPTION OF THE EMBODIMENTS

First Embodiment

Figure 1:
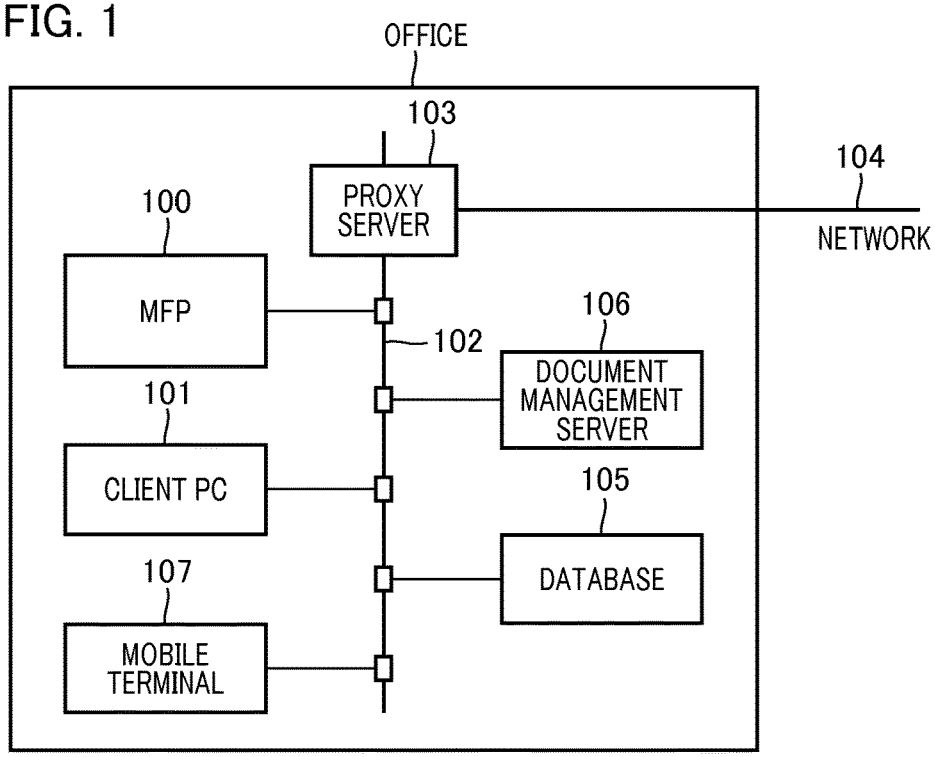
FIG. 1 is a block diagram illustrating an image processing system according to the present invention.

FIG. 1 is a block diagram illustrating a configuration of an image processing system to which the present invention is applied. As shown in FIG. 1, the image processing system includes an MFP 100, a client PC 101, a proxy server 103, a document management server 106, and a database 105 for the document management server 106. The MFP 100 is a multi-function peripheral that realizes a plurality of types of functions (copy function, print function, transmission function, and the like). The client PC 101 or the mobile terminal 107 transmits, for example, print data to the MFP 100 to cause the MFP 100 to output a printed material based on the print data. The aforementioned devices are wiredly or wirelessly connected to a LAN 102. The LAN (Local Area Network) 102 is also connected to a network 104 via the proxy server 103. The configuration shown in FIG. 1 is to be considered as an example. A plurality of offices having a similar configuration may be connected to the network 104.

Each of the client PC 101 and the proxy server 103 includes standard building components installed in a general-purpose computer. For example, each of the client PC 101 and the proxy server 103 includes a CPU, a RAM, a ROM, a hard disk, a network I/F, a display, a keyboard, a mouse, and the like, where CPU is an abbreviation for Central Processing Unit, RAM is an abbreviation for Random Access Memory, and ROM is an abbreviation for Read Only Memory. The network 104 is typically implemented by any of the Internet, a LAN, a WAN, a telephone line, a leased digital network, an asynchronous transfer mode (ATM)-frame relay network, a communication satellite network, a cable television network, and a wireless network for data broadcasting, and the like, where WAN is an abbreviation for Wide Area Network. It goes without saying that the network 104 may be a communication network implemented with a combination of these networks as long as data transmission and reception are possible.

Figure 2:
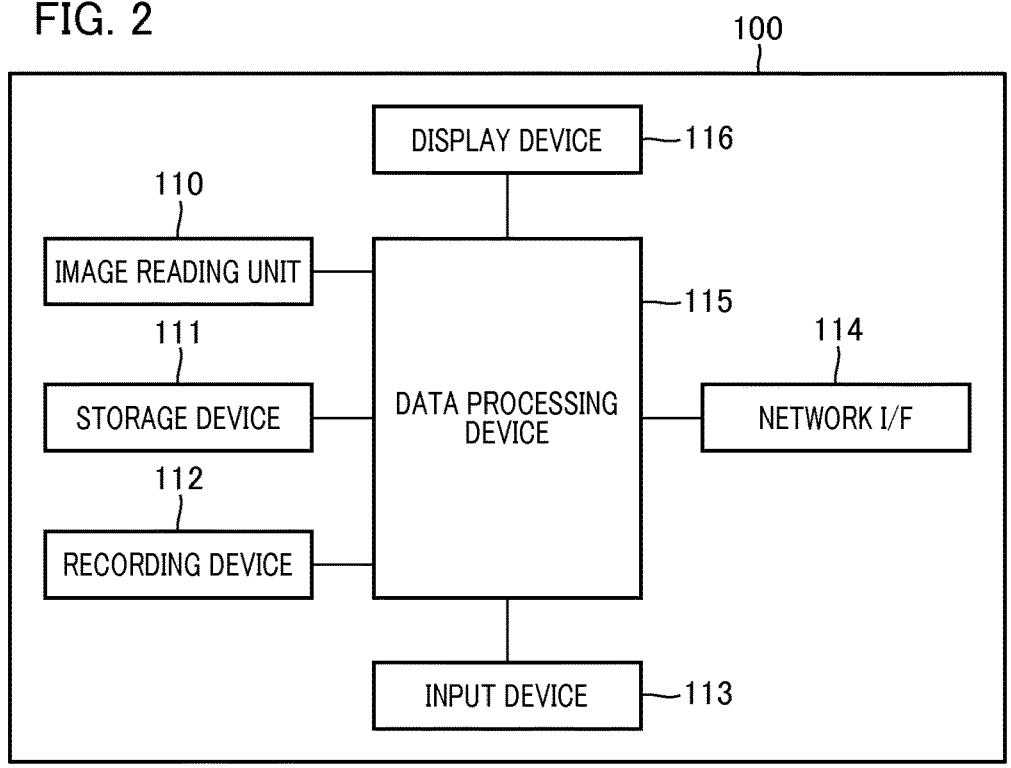
FIG. 2 is a block diagram illustrating a functional configuration of a multifunction peripheral (MFP) shown in FIG. 1.

FIG. 2 is a block diagram illustrating a functional configuration of the MFP 100 shown in FIG. 1. As shown in FIG. 2, the MFP 100 includes an image reading unit 110, a storage device (hereinafter also referred to as "BOX") 111, a recording device 112, a data processing device 115, an input device 113, a display device 116, and a network I/F 114.

The image reading unit 110 has an Auto Document Feeder (hereinafter referred to as "ADF") (not shown), and irradiates images of a bundle of sheets or one sheet with light and then forms a reflected image on a solid-state image sensing element via a lens. The solid-state image sensing element generates an image reading signal having a predetermined resolution (e.g., 600 dots per inch (dpi)) and a predetermined luminance level (e.g., 8 bits), and then generates image data including raster data from the image reading signal. The data processing device 115 converts the bitmap image data generated by the image reading unit 110 into a recording signal by scan image processing to be described below.

The recording device 112 forms an image (outputs a print product) using the recording signal converted by the data processing device 115. When copying a plurality of sheets, the recording device 112 once stores recording signals for one page in the BOX 111, and then sequentially outputs the recording signals to the recording device 112 to thereby form a recording image on recording paper. The BOX 111 has a function capable of storing the image data from the image reading unit 110 and the PDL data output from the local PC 102 via the driver. The MFP 100 is operated via a key operation unit (input device 113) provided for the MFP 100 and may display the state of operation input by using the display device 116.

When PDL data is transmitted from the local PC 101 (or another general-purpose PC (not shown)) via the driver, the network I/F 114 receives PDL data via the LAN 102 and the network I/F 114. Then, the recording device 112 records an image based on the received PDL data. Specifically, the PDL data output from the local PC 101 via the driver is input from the LAN 102 to the data processing device 115 via the network I/F 114. Then, after the data processing device 115 interprets and processes the language to convert the PDL data into a recordable recording signal, the MFP 100 can record the recording signal as a recording image on recording paper.

Figure 3:
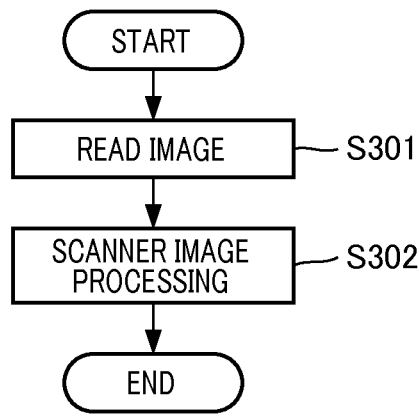
FIG. 3 is a process flow for converting data from a scanner into bitmap data.

Next, a description will be given of bitmap image data (document image data) creation with reference to FIG. 3 and FIG. 4. FIG. 3 is a flowchart for creating bitmap image data using the image reading unit 110 of the MFP 100. When the MFP 100 is used, the image reading unit 110 reads an image in step S301 shown in FIG. 3. The read image is already bitmap image data. In step S302, scanner image processing depending on the image reading unit 110 is performed for the bitmap image data. The term "scanner image processing" in this context refers to, for example, color processing or filter processing.

Figure 4:
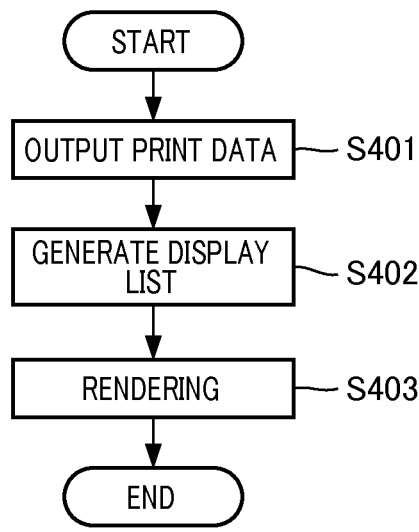
FIG. 4 is a process flow for converting data from a personal computer (PC) into bitmap data.

FIG. 4 is a flowchart for creating bitmap image data by application software on the PC 102. In step S401, the data created by using the application software on the PC 102 is converted into print data by a printer driver provided in the PC 102 and then is transmitted to the MFP 100. The term "print data" in this context means PDL and refers to a page description language such as LIPS (Trademark), Postscript (Trademark), or the like. Next, in step S402, the data processing device 115 of the MFP 100 functions as an interpreter and generates a display list. In step S403, the data processing device 115 performs rendering of the display list to thereby generate bitmap image data.

Figure 5:
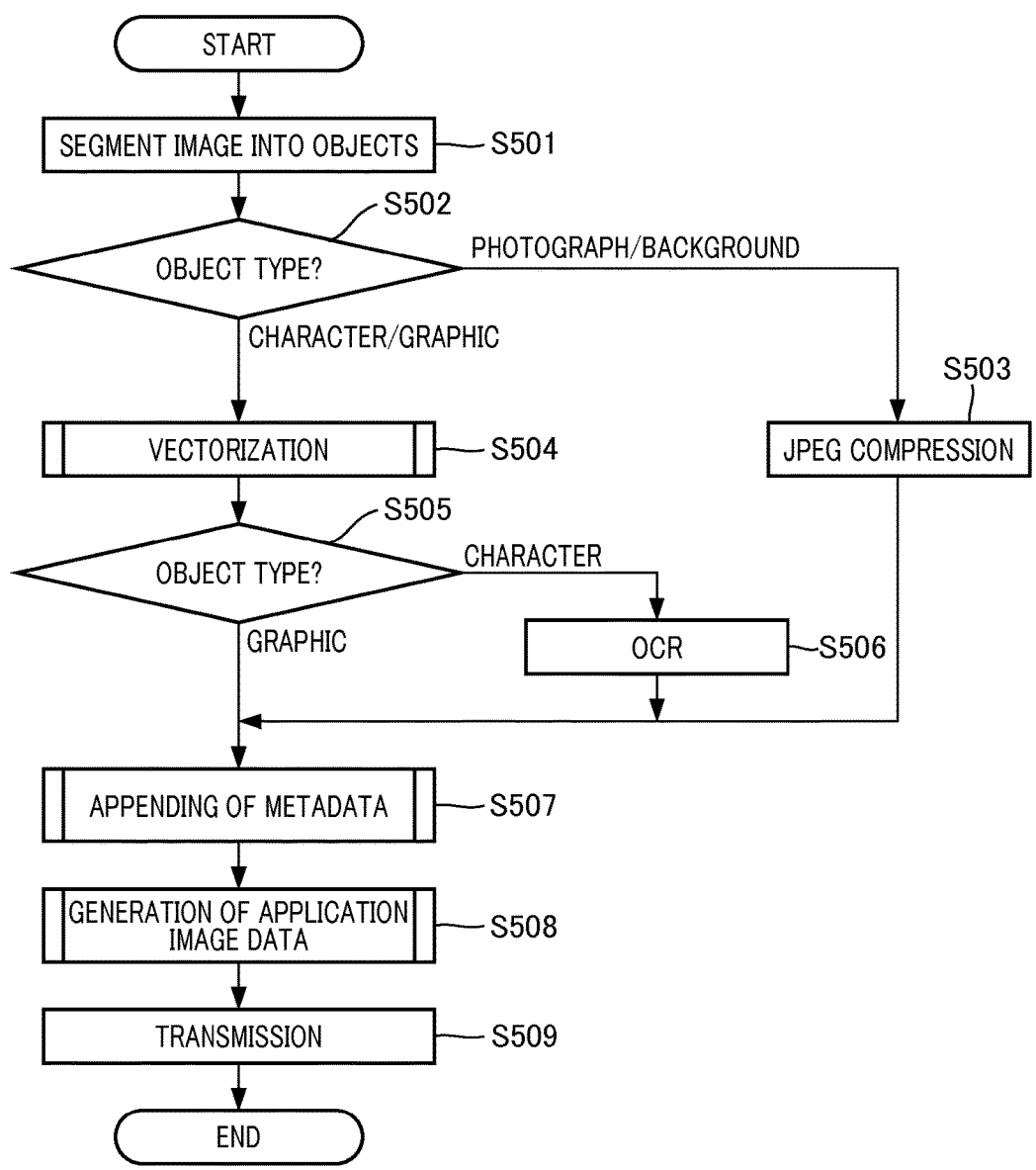
FIG. 5 is a flowchart illustrating application image data generation processing.

Next, a description will be given of an application image data generation flow with reference to FIG. 5. In the flow, the MFP 100 generates data in a predetermined format (hereinafter referred to as "application image data") to be displayed on the mobile terminal 107 from bitmap image data. The bitmap image data is acquired by the image reading unit 110 of the MFP 100. Also, the data processing device 115 within the MFP 100 performs rendering of the document created by application software on the local PC 102 to thereby generate bitmap image data.

In step S501, the data processing device 115 applies object segmentation processing to the bitmap image data to segment it into a plurality of objects having respective attributes. In the present embodiment, object attribute types after object segmentation include character, photograph, graphic (rendering, line rendering, table, and line), and background. In step S502, the data processing device 115 determines the object type (character, photograph, graphic, or background) for each segmented object. When an object is determined to be a photograph or background, the processing proceeds to step S503, and the data processing device 115 applies JPEG compression to a bitmap image of the relevant object.

On the other hand, when the relevant object is determined to be a character or a graphic, the processing proceeds to step S504, and the data processing device 115 applies vectorization processing to the relevant object to convert it into path data (vector data). Next, in step S505, the data processing device 115 determines whether or not the relevant object is a character or a graphic. When the relevant object is determined to be a character, in step S506, the data processing device 115 applies optical character recognition (OCR) processing to the relevant object to acquire character-coded data (character code data resulting from the OCR processing).

The data processing device 115 groups the data of each object (JPEG data and vector data) obtained in steps S503 and S504 and the character-coded data obtained in step S506 into one file. Next, in step S507, the data processing device 115 appends optimum metadata to each object. In step S508, the data processing device 115 generates application image data displayable on the mobile terminal 107 based on each object having appended metadata. Finally, in step S509, the data processing device 115 transmits the generated application image data to the mobile terminal 107 via the network I/F.

Figure 6:
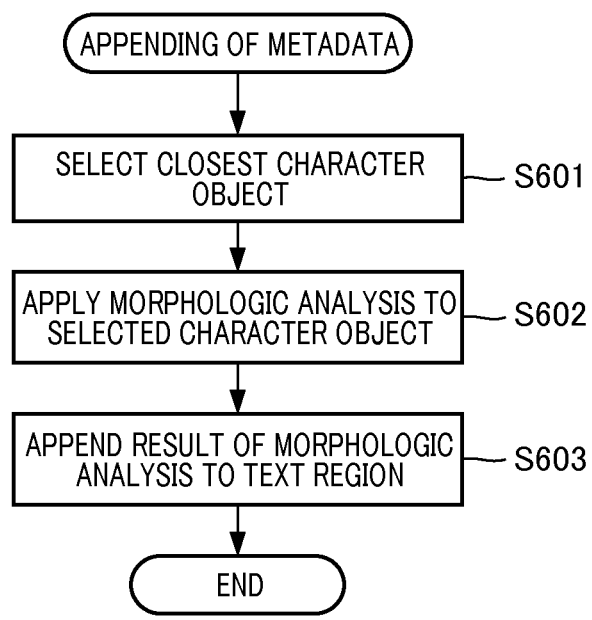
FIG. 6 is a process flow for appending meta information.

A description will be given in detail of processing for appending metadata in step S506 shown in FIG. 5 with reference to the flowchart shown in FIG. 6. Firstly, in step S601, the data processing device 115 selects a closest character object existing around each of segmented objects formed in step S501. Next, in step S602, the data processing device 115 applies morphologic analysis to the selected character object. Next, in step S603, the data processing device 115 appends a word extracted as a result of the morphologic analysis in step S602 to each object as metadata. Metadata can be created not only through the morphologic analysis but also through image feature quantity extraction, syntax analysis, and the like. Furthermore, the data processing device 115 may also create metadata by the following processing. In other words, the data processing device 115 performs similar image search in documents already stored in the BOX 111 incorporated in the MFP 100, documents already stored in the database 105 of the image processing system, and objects contained in these documents. Then, the data processing device 115 performs correlation with objects of similar images having high similarity.

Figure 7A:
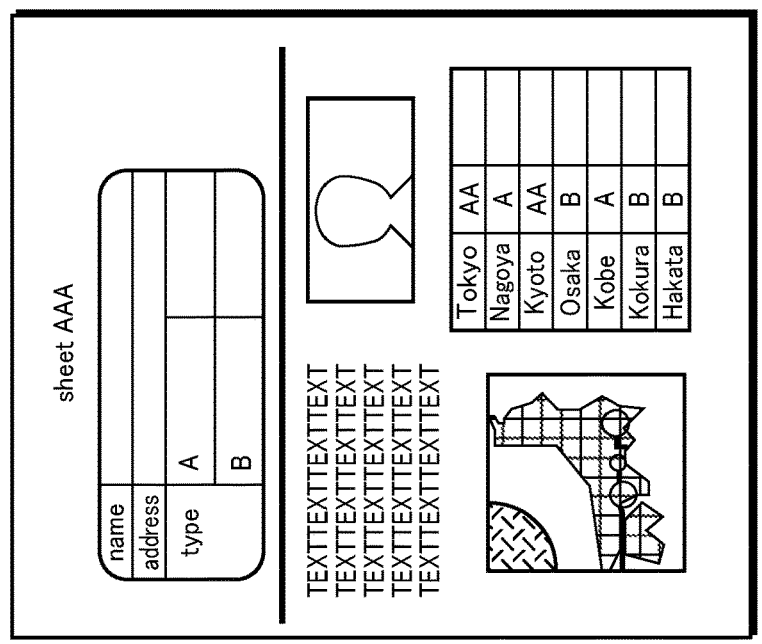
FIGS. 7A and 7B illustrate examples of object segmentation.
Figure 7B:
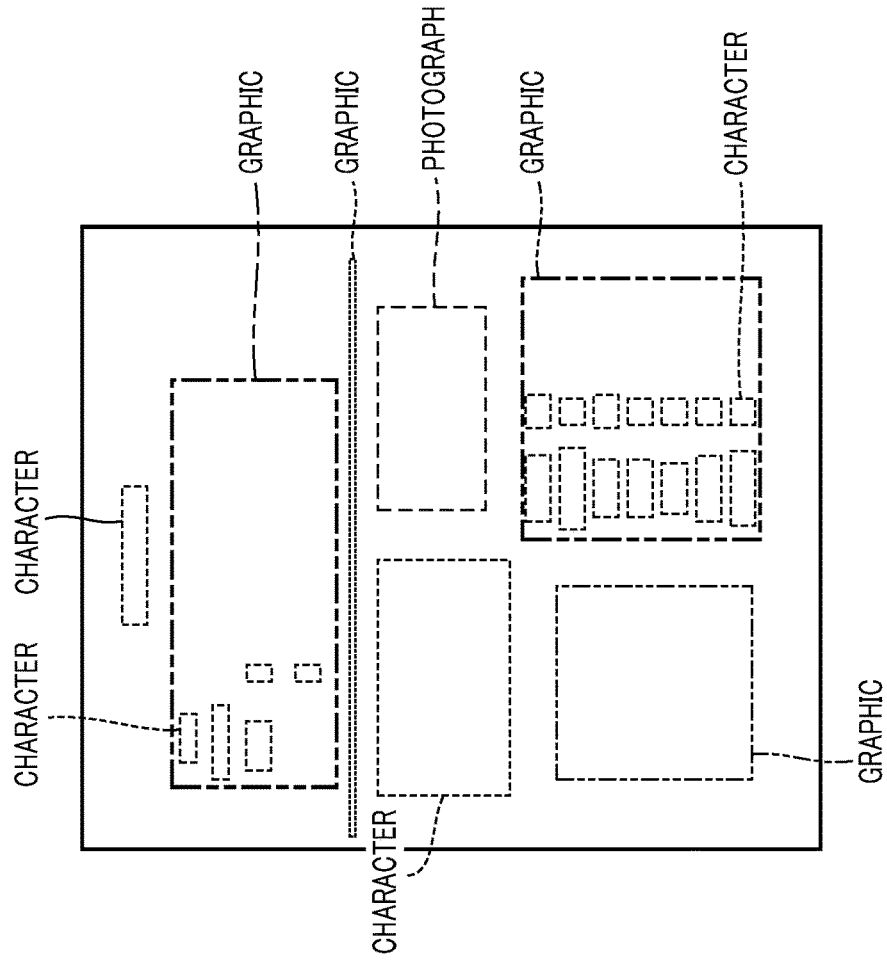

Next, a detailed description will be given of the object segmentation performed in step S501 with reference to FIGS. 7 and 8. FIG. 7A shows an example of the input bitmap image data. FIG. 7B shows an exemplary result of object segmentation processing for segmenting the bitmap image data into a plurality of objects. FIG. 8 shows block information and input file information for each object when the object segmentation is performed.

In step S501, the data processing device 115 applies object segmentation processing to an input image shown in FIG. 7A to segment it into rectangular blocks having respective attributes. The segmented rectangular blocks are shown in FIG. 7B. As described above, rectangular block attributes include character, photograph, and graphic (rendering, line rendering, table, line).

With an exemplary method for object segmentation processing, processing is performed in the following way. Firstly, the data processing device 115 applies monochrome binarization to the image data stored in the RAM (not shown) in the MFP 100 to extract a pixel cluster surrounded by black pixel contours. Furthermore, the data processing device 115 evaluates the size of the black pixel cluster extracted in this way and applies contour tracking to a white pixel cluster in the black pixel cluster having a size of a predetermined value or larger. Then, the data processing device 115 evaluates the size of the white pixel cluster and applies contour tracking to a black pixel cluster in the white pixel cluster. Such as the evaluation with respect to the black pixel cluster and the contour tracking to the black pixel cluster, as long as an inner pixel cluster has a size of the predetermined value or larger, the data processing device 115 recursively performs inner pixel cluster extraction and contour tracking. The size of a pixel cluster is evaluated, for example, in terms of the area of the pixel cluster. The data processing device 115 generates a rectangular block which circumscribes the pixel cluster acquired in this way and determines the attribute based on the size and shape of the generated rectangular block.

For example, a rectangular block whose aspect ratio is near 1 and size falls within a predetermined range is determined as a character-equivalent block which can be a character region rectangular block. When character-equivalent blocks in close vicinity are regularly arrayed, the data processing device 115 generates a new rectangular block by grouping these character-equivalent blocks, and recognizes the new rectangular block as a character region rectangular block. A black pixel block containing a flat pixel cluster or a regularly aligning rectangular white pixel cluster having a size of a predetermined value or larger is considered as a graphic region rectangular block. A pixel cluster having an irregular shape is considered as a photographic region rectangular block.

Next, for each of the rectangular blocks generated in this way, the data processing device 115 generates block information such as attributes and input file information as shown in FIG. 8. In FIG. 8, the block information includes the attribute, position coordinates X and Y, width W, height H, and OCR information for each block. The attribute is represented by a numerical value 1, 2, and 3, respectively indicating a character region rectangular block, a photographic region rectangular block, and a graphic region rectangular block. The coordinates X and Y represent the X- and Y-coordinates of the starting point (the coordinates of the top left corner) of each rectangular block in the input image. The width W is the width in the X-coordinate direction of the rectangular block, and the height H is the height in the Y-coordinate direction thereof. The OCR information indicates the presence or absence of pointer information to character-coded data generated by the OCR processing in the step S508. The input file information further includes a total number of blocks (N) which indicates the total number of rectangular blocks.

The block information for each rectangular block will be utilized for vectorization in a specific region. When combining a specific region and other regions, the block information enables identifying a relative positional relationship and combining a vectorized region and a bitmap region without impairing the layout of the input image.

Figure 9:
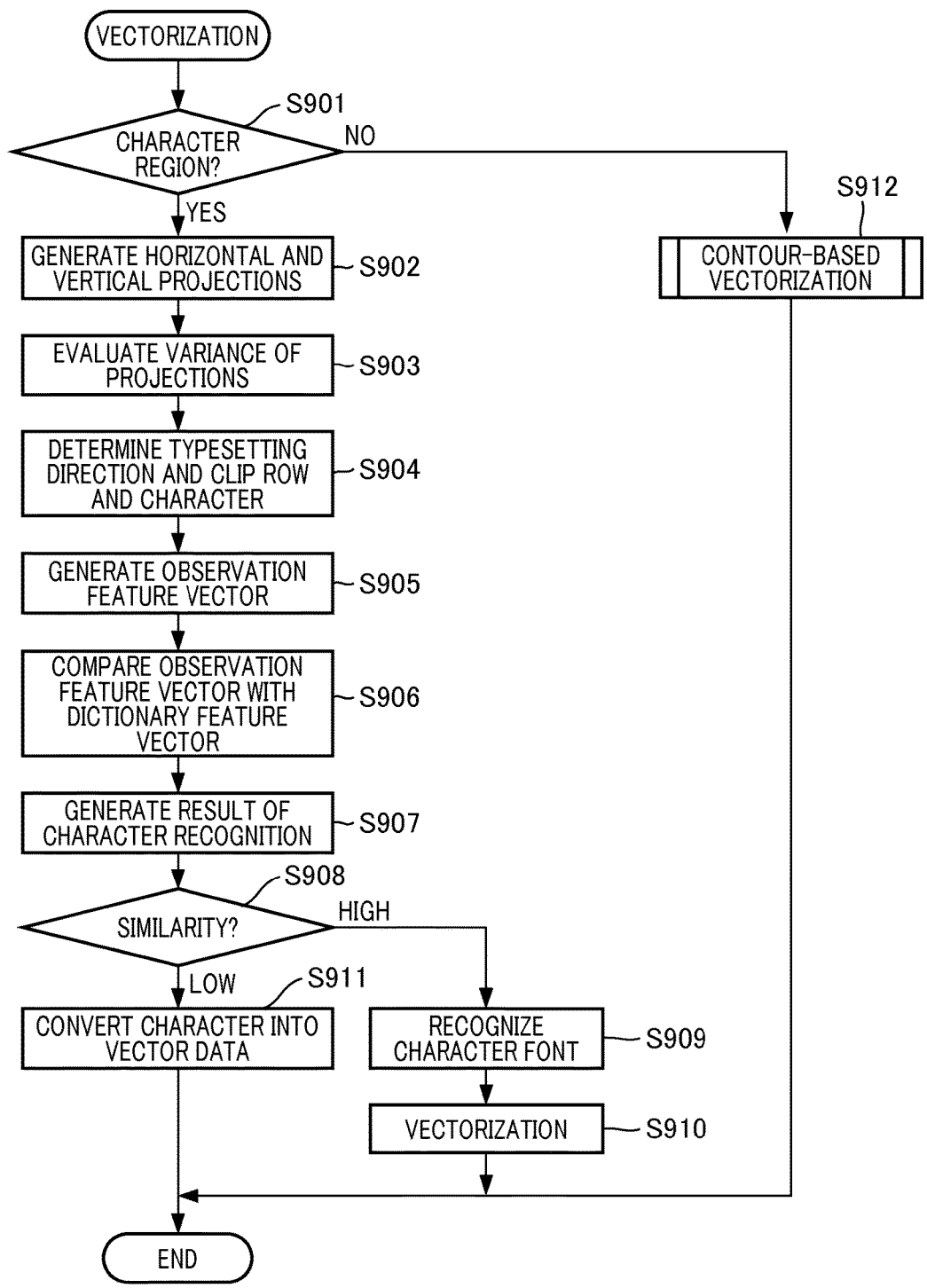
FIG. 9 is a flowchart illustrating vectorization processing.

Next, a detailed description will be given of the vectorization processing in step S504 shown in FIG. 5 with reference to the flowchart shown in FIG. 9. In step S901, the data processing device 115 determines whether or not the specific region is a character region rectangular block. When the specific region is determined to be a character region rectangular block, the processing proceeds to step S902 and subsequent steps. On the other hand, when the specific region is determined not to be a character region rectangular block, the processing shifts to step S912.

In steps S902 to S907, the data processing device 115 performs character recognition processing by using a pattern matching method or the like to thereby obtain a corresponding character code. For example, in step S902, the data processing device 115 calculates the horizontal and vertical projections with respect to the pixel values in the specific region in order to determine horizontal/vertical writing direction for the specific region (determination of typesetting direction). Next, in step S903, the data processing device 115 evaluates variance of the projections acquired in step S902. When variance of the horizontal projection is large, the data processing device 115 determines that the typesetting direction is horizontal. When variance of the vertical projection is large, the data processing device 115 determines that the typesetting direction is vertical. In step S904, based on the result of the evaluation in step S903, the data processing device 115 determines the typesetting direction, clips a row, and then clips characters to thereby obtain a character image. Specifically, the data processing device 115 decomposes the character image into character strings and characters. In the case of a horizontal writing character region, the data processing device 115 clips a row based on the horizontal projection and clips characters based on the vertical projection for the clipped row. In the case of a vertical writing character region, the data processing device 115 performs processing in reverse way (specifically, the data processing device 115 clips a column based on the vertical projection and clips characters based on the horizontal projection for the clipped column). When clipping a row and characters, the character size can also be detected.

Next, in step S905, for each character clipped in step S904, the data processing device 115 generates an observation feature vector by converting the feature acquired from the character image into a numerical sequence having several tens dimensions. There are various known techniques for extracting a feature vector. For example, a certain technique segments a character in a mesh pattern, counts the number of character lines in each mesh as a line element in each direction, and creates mesh several-dimensional vector as a feature vector.

In step S906, the data processing device 115 compares the observation feature vector acquired in step S905 with the dictionary feature vector acquired in advance for each font type to thereby calculate the distance between the observation feature vector and the dictionary feature vector. In step S907, the data processing device 115 evaluates the distance calculated in step S906 and considers the font type having the shortest distance as a recognition result. Next, in step S908, the data processing device 115 determines whether or not the shortest distance acquired in the distance evaluation in step S907 is greater than a predetermined value, i.e., determines the similarity. When the shortest distance is determined to be equal to or greater than the predetermined value (similarity is low), the character may possibly be erroneously recognized as others having a similar shape in the dictionary feature vector. Accordingly, when the shortest distance is determined to be equal to or greater than the predetermined value (similarity is low), the data processing device 115 does not adopt the recognition result in step S907, and the processing proceeds to step S911. When the shortest distance is determined to be smaller than the predetermined value (similarity is high), the data processing device 115 adopts the recognition result in step S907, and the processing proceeds to step 909.

In step S909, the data processing device 115 recognizes the type of character font. A plurality of sets of dictionary feature vectors for the number of font types used in character recognition are prepared in correspondence with character shape types, i.e., font types. At the time of pattern matching, the font type is output together with the character code to enable character font recognition. Next, in step S910, the data processing device 115 converts each character into vector data by using the character code and font information obtained by character recognition and font recognition and outline data prepared for each character in advance. When the input image is a color image, the data processing device 115 extracts the color of each character from the color image and then records the color together with the vector data.

On the other hand, in step S911, the data processing device 115 outlines the character by handling it in a similar way to graphics. Specifically, for characters which are highly likely to be erroneously recognized, the data processing device 115 generates outline vector data apparently conforming to the bitmap data. When the specific region is not a character region rectangular block (that is, when the specific region is a graphic region rectangular block), in step S912, the data processing device 115 executes the vectorization processing based on the contour of the image. The above-described processing enables converting image information belonging to the character and graphic region rectangular blocks into vector data.

Figure 10:
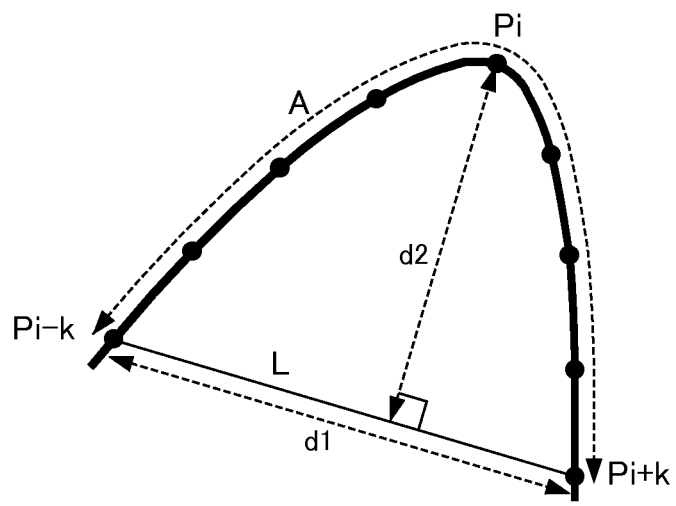
FIG. 10 illustrates corner extraction processing in the vectorization processing.
Figure 11:
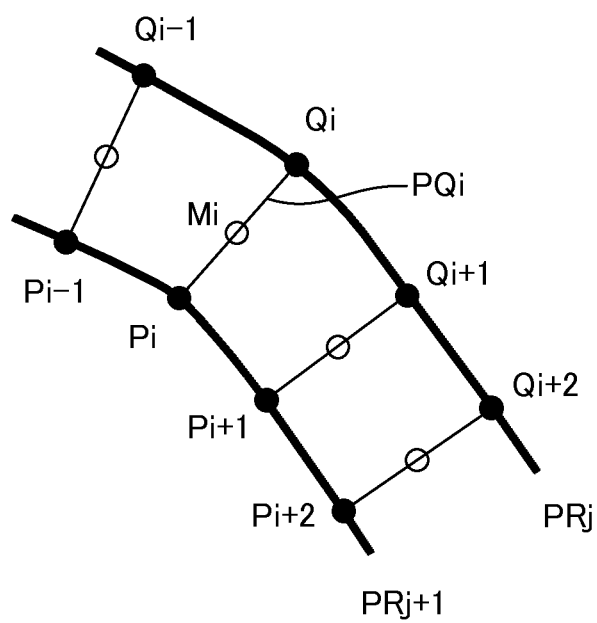
FIG. 11 illustrates contour lines grouping processing in the vectorization processing.
Figure 12:
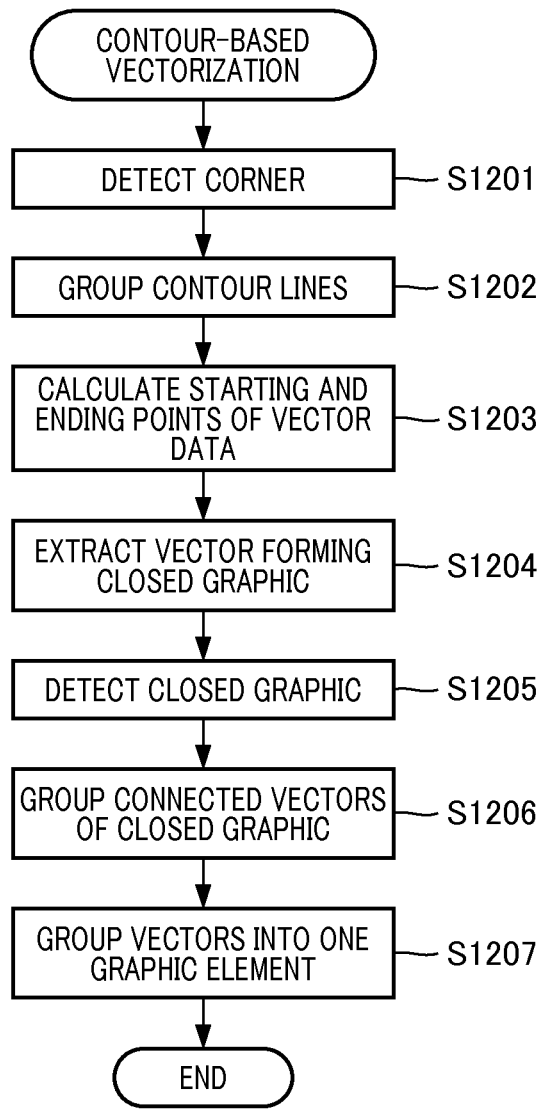
FIG. 12 is a flowchart illustrating contour-based vectorization processing.

A detailed description will be given of the vectorization processing applied to the graphic region rectangular block in step S912 with reference to FIGS. 10, 11, and 12. The data processing device 115 applies the vectorization processing to the graphic region rectangular block based on the contours of the black pixel clusters extracted in the relevant region. FIG. 10 is a diagram illustrating corner extraction processing in the vectorization processing. FIG. 11 is a diagram illustrating contour lines grouping processing in the vectorization processing. FIG. 12 is a flowchart illustrating in detail the vectorization processing for the graphic region.

In step S1201 shown in FIG. 12, the data processing device 115 detects a "corner" which segments a curve into a plurality of sections (pixel columns) in order to represent a line rendering or the like as a combination of straight lines and/or curves. A corner refers to a point at which the curvature is maximized. As shown in FIG. 10, the data processing device 115 determines whether or not a pixel Pi on a curve is a corner in the following way. Specifically, pixels Pi−k and Pi+k which are separated from the pixel Pi as a starting point by a predetermined number of pixels (k pixels) in two directions, respectively, along the curve are connected with a line segment L. Let d1 be the distance between the pixels Pi−k and Pi+k, d2 be the distance between the line segment L and the pixel Pi, and A be the length of the arc of the curve between the pixels Pi−k and Pi+k. When the distance d2 is maximized or when a ratio (d1/A) is equal to or smaller than a threshold value, the data processing device 115 determines the pixel Pi as a corner. The data processing device 115 approximates the pixel columns segmented by the corner to a straight line or a curve. The approximation to a straight line is made by using the least squares method or the like and the approximation to a curve is made by using the cubic spline function or the like. The pixel of the corner segmenting the pixel columns serves as a starting or ending point of the approximation straight line or approximation curve.

Furthermore, the data processing device 115 determines whether or not an inner contour of a white pixel cluster exists in the vectorized contour. When an inner contour is determined to exist, the data processing device 115 vectorizes the inner contour. Similarly, as long as an inner contour exists, the data processing device 115 recursively vectorizes an inner contour of an inverted pixel. As described above, the use of the contour segmentation line approximation enables vectorizing the contour of a graphic having any shape. When the original document is colored, the data processing device 115 extracts colors of graphics from the color image and records the colors together with the vector data.

In step S1202, when the contour lines acquired in step S1201 are in close vicinity, the data processing device 115 groups these contour lines to form a line having a thickness. As shown in FIG. 11, when an outer contour PRj is in close vicinity of an inner contour PRj+1 or another outer contour in a certain target section, the data processing device 115 can group two or more contour lines and represent them as a line having a thickness. For example, the data processing device 115 calculates a distance PQi from each pixel Pi on a contour PRj+1 to a pixel Qi which is arranged at the shortest distance on a contour PRj. With a small variance in the distance PQi, the data processing device 115 may approximate the target section by using a straight line or curve extending along a point sequence of a midpoint Mi between pixels Pi and Qi. The thickness of the approximation straight line and approximation curve is considered to be, for example, the average of the distance PQi. Considering tabular ruled lines (lines and a set of lines) as a set of lines having a thickness enables efficient vector expression.

In step S1203, the data processing device 115 calculates starting and ending points of each piece of vector data. In step S1204, the data processing device 115 detects graphic elements by using the starting point information and the ending point information acquired in step S1203. A graphic element refers to a closed graphic formed of sectioned lines. To detect a graphic element, the data processing device 115 connects vectors at the pixel of the common corner which serves as starting and ending points. Specifically, this processing is based on a principle that each of vectors forming a closed shape has connecting vectors at both ends.

In step S1205, the data processing device 115 removes unnecessary vectors not connecting with both ends based on the vector data to thereby extract only vectors forming the closed graphic. In step S1206, starting with one edge point (starting or ending point) of any one vector, the data processing device 115 sequentially search for each of the vectors forming the closed graphic in a fixed direction, for example, in the clockwise direction. Specifically, at the other edge point of the relevant vector, the data processing device 115 searches for an edge point of other vector, and considers the closest edge point within a predetermined distance as an edge point of a connection vector. When the data processing device 115 completes search for all of the vectors forming the closed graphic and returns to the starting point, the data processing device 115 groups all of the traced vectors as a closed graphic forming a graphic element. The data processing device 115 also groups all of the vectors forming the closed graphic existing in the closed graphic. The data processing device 115 further repeats similar processing starting with the starting point of a vector which has not yet been grouped.

In step S1207, among unnecessary vectors removed in step S1205, the data processing device 115 detects a vector having an edge point close to any vector grouped as a closed graphic in step S1206, and groups the detected vector as a graphic element. This enables grouping other graphic elements exiting in the graphic elements or sectioned lines to form a graphic object. Further, when other graphic elements or sectioned lines do not exist in the graphic element, the data processing device 115 considers the graphic element as a graphic object. The above-described processing enables converting the graphic region rectangular block into a vectorized object.

Figure 13:
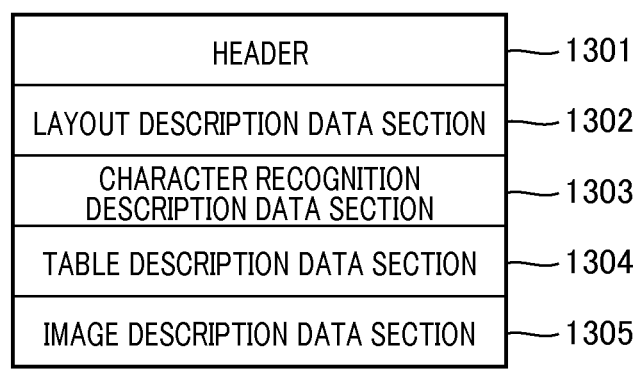
FIG. 13 is a map illustrating data as a result of the vectorization processing.
Figure 14:
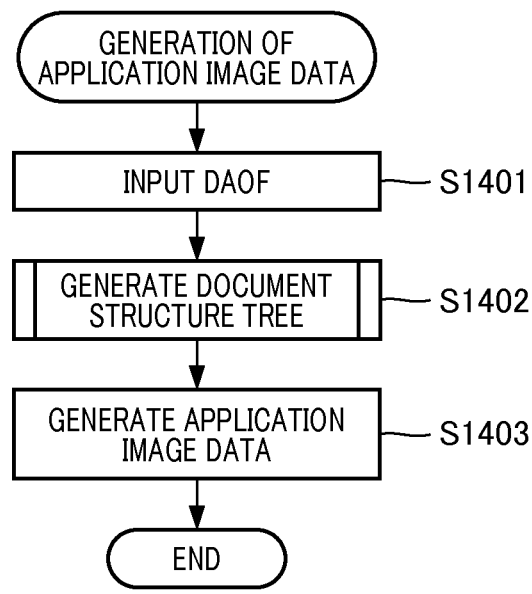
FIG. 14 is a flowchart illustrating application image data generation processing.

Next, a detailed description will be given of processing for generating application image data in step S507 with reference to FIGS. 13 to 14. FIG. 13 is the map of a data configuration resulting from the vectorization processing according to the present embodiment. FIG. 14 is a flowchart illustrating the application image data generation processing in detail.

In step S1401, the data processing device 115 acquires intermediate data generated by the vectorization processing in step S504. In the present embodiment, the MFP 100 stores the intermediate data in a format, i.e., in a so-called document analysis output format (hereinafter referred to as "DAOF") in the storage device 111. As shown in FIG. 13, the DAOF data includes a header 1301, a layout description data section 1302, a character recognition description data section 1303, a table description data section 1304, and an image description data section 1305.

The header 1301 stores information about an input image to be processed. The layout description data section 1302 stores information about the attribute of a rectangular block in the input image, such as character, graphic (line rendering, rendering, table, and line), photograph, and the like, and positional information of the rectangular block with recognized attribute. The character recognition description data section 1303 stores a result of character recognition obtained through character recognition among the character region rectangular blocks. The table description data section 1304 stores a detailed table structure of a graphic region rectangular block having the table attribute. In the specific region where the vectorization processing is instructed, the image description data section 1305 stores the internal structure of a block acquired through the vectorization processing and data set indicating the image shape, character code, and the like. On the other hand, in rectangular blocks other than the specific region not subjected to the vectorization processing, the image description data section 1305 stores bitmap image data itself segmented into objects.

Next, in step S1402, the data processing device 115 generates a document structure tree to be described below. In step S1403, the data processing device 115 acquires actual data in the DAOF based on the generated document structure tree to thereby generate application image data to be described below.

Figure 15:
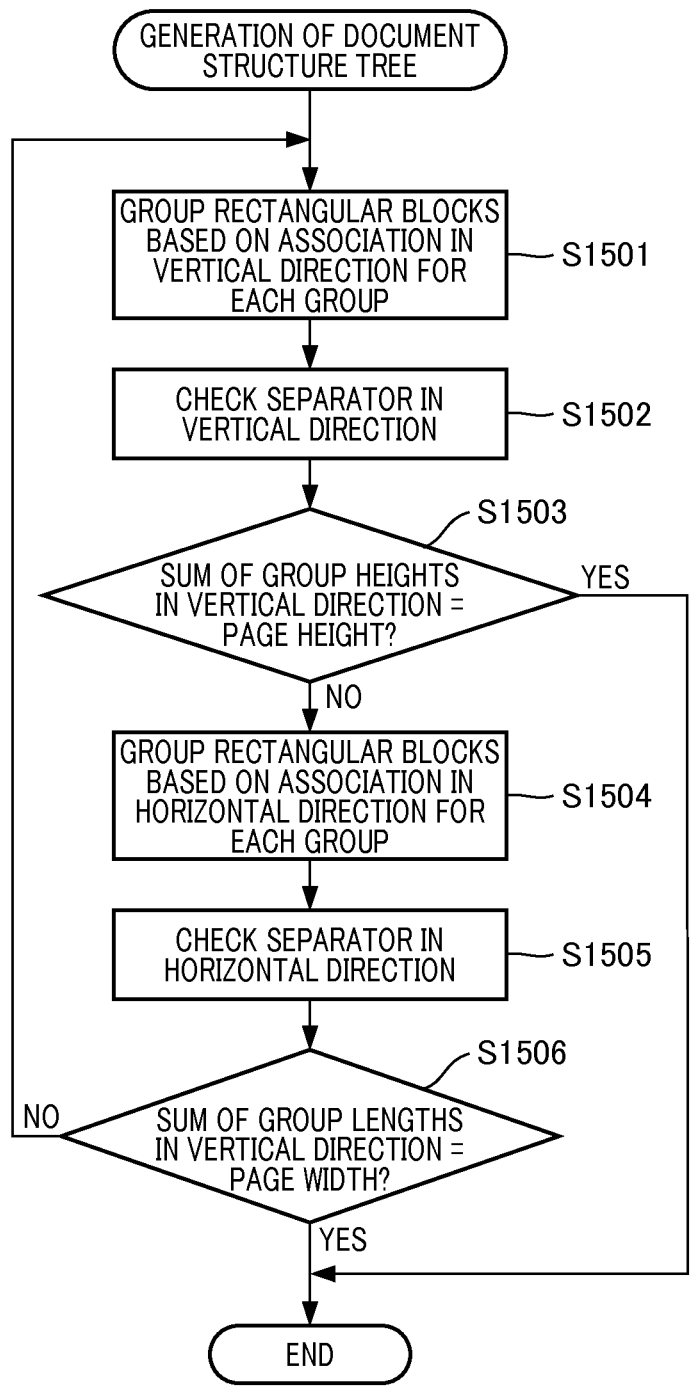
FIG. 15 is a flowchart illustrating document structure tree generation processing.
Figure 16:
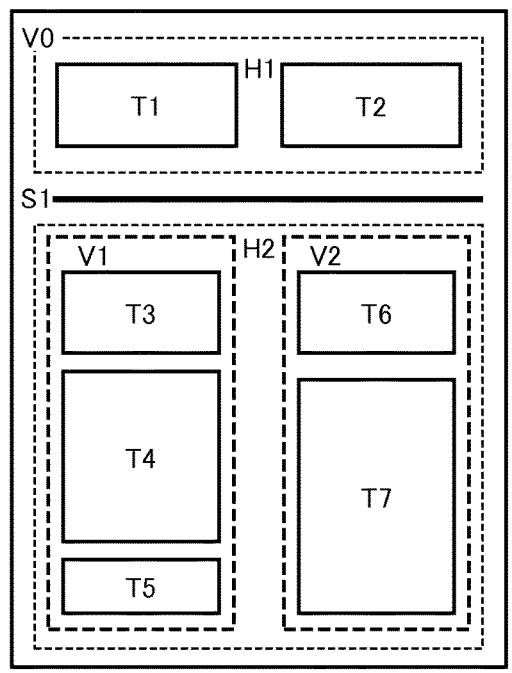
FIG. 16 is a diagram illustrating a document subjected to the document structure tree generation processing.
Figure 17:
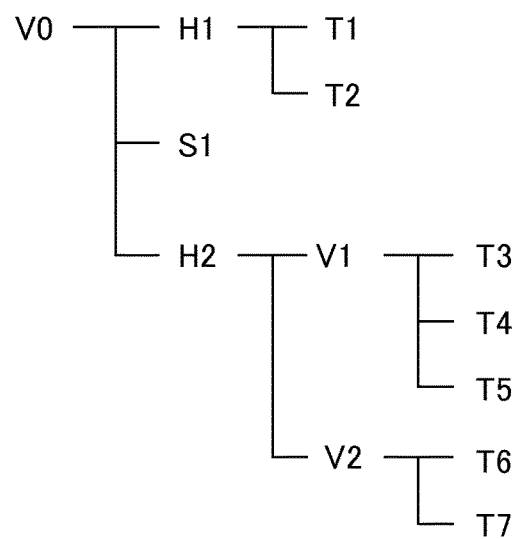
FIG. 17 is a diagram illustrating a document structure tree generated by the processing shown in FIG. 16.

Next, a description will be given of processing for generating a document structure tree in step S1402 with reference to FIGS. 15, 16, and 17. FIG. 15 is a flowchart illustrating the document structure tree generation processing. FIG. 16 is a diagram illustrating an exemplary document subjected to the document structure tree generation processing. FIG. 17 is a diagram illustrating a document structure tree generated by the document structure tree generation processing.

As a basic rule for overall control in the document structure tree generation processing shown in FIG. 15, the flow of processing shifts from a micro block (single rectangular block) to a macro block (set of rectangular blocks). Hereinafter, the term "rectangular block" means both the micro block and the macro block.

In step S1501, the data processing device 115 re-groups rectangular blocks based on the association in the vertical direction on a rectangular block basis. Although the processing shown in FIG. 15 may be repetitively executed, the data processing device 115 makes determination on a micro block basis immediately after the grouping processing is started. The association is defined by such features as a short distance and almost the same block width (block height in the case of horizontal direction). The data processing device 115 extracts information such as the distance, width, and height with reference to the DAOF.

For example, referring to a document shown in FIG. 16, rectangular blocks T1 and T2 are horizontally arranged at the top. A horizontal-direction separator S1 exists under the rectangular blocks T1 and T2. Rectangular blocks T3, T4, T5, T6, and T7 exist under the horizontal-direction separator S1. The rectangular blocks T3, T4, and T5 are vertically arranged on the left half of the region under the horizontal-direction separator S1. The rectangular blocks T6 and T7 are vertically arranged on the right half of the region under the horizontal-direction separator S1. When the data processing device 115 executes the grouping processing based on the association in the vertical direction in step S1501, the rectangular blocks T3, T4, and T5 are grouped into a group (rectangular block) V1, and the rectangular blocks T6 and T7 are grouped into a group (rectangular block) V2. The groups V1 and V2 belong to the same hierarchical level.

Next, in step S1502, the data processing device 115 checks the presence or absence of a vertical-direction separator. A separator is an object having the line attribute in the DAOF, and has a function of explicitly segmenting a block. When a separator is detected, the data processing device 115 segments the region of the input image into right and left parts by using the separator as a boundary in the target hierarchical level. No vertical-direction separator exists in the document shown in FIG. 16.

Next, in step S1503, the data processing device 115 determines whether or not the sum of group heights in the vertical direction is equal to the height of the input image. Specifically, when the data processing device 115 performs horizontal-direction grouping while moving the target region in the vertical direction (e.g., from the top downward) and completes the processing for the entire input image, the data processing device 115 determines whether or not the processing ends using the fact that the sum of group heights is equal to the height of the input image. When grouping is determined to be completed, the data processing device 115 ends the processing, whereas when grouping is determined not to be completed, the processing proceeds to step S1504.

Next, in step S1504, the data processing device 115 executes the grouping processing based on the association in the horizontal direction. Thus, for example, the rectangular blocks T1 and T2 shown in FIG. 16 are grouped into a group (rectangular block) H1, and the rectangular blocks V1 and V2 are grouped into a group (rectangular block) H2. The groups H1 and H2 belong to the same hierarchical level. Also in this case, the data processing device 115 makes determination on a micro block basis immediately after the grouping processing is started.

Next, in step S1505, the data processing device 115 checks the presence or absence of a horizontal-direction separator. When a horizontal-direction separator is detected, the data processing device 115 vertically segments the region of the input image by using the separator as a boundary in the target hierarchical level. As shown in FIG. 16, the horizontal-direction separator S1 exists. The data processing device 115 registers a result of the above-described processing as a document structure tree shown in FIG. 17.

As shown in FIG. 17, input 1-page bitmap image data V0 has the groups H1 and H2 and the separator S1 in the highest hierarchical level. The rectangular blocks T1 and T2 in the second hierarchical level belong to the group H1. The groups V1 and V2 in the second hierarchical level belong to the group H2. The rectangular blocks T3, T4, and T5 in the third hierarchical level belong to the group V1. The rectangular blocks T6 and T7 in the third hierarchical level belong to the group V2. In the present embodiment, V0 indicates a page, and other elements in the hierarchies under the page V0 are all objects.

Finally, in step S1506, the data processing device 115 determines whether or not the sum of group lengths in the horizontal direction is equal to the width of the input image to thereby determine whether or not horizontal-direction grouping is completed. When the sum of group lengths in the horizontal direction is determined to be equal to the page width, the document structure tree generation processing ends. When the sum of group lengths in the horizontal direction is determined not to be equal to the page width, the processing returns to step S1501, and the data processing device 115 repeats the above-described processing again from association check in the vertical direction in the higher hierarchical level.

Figure 18B:
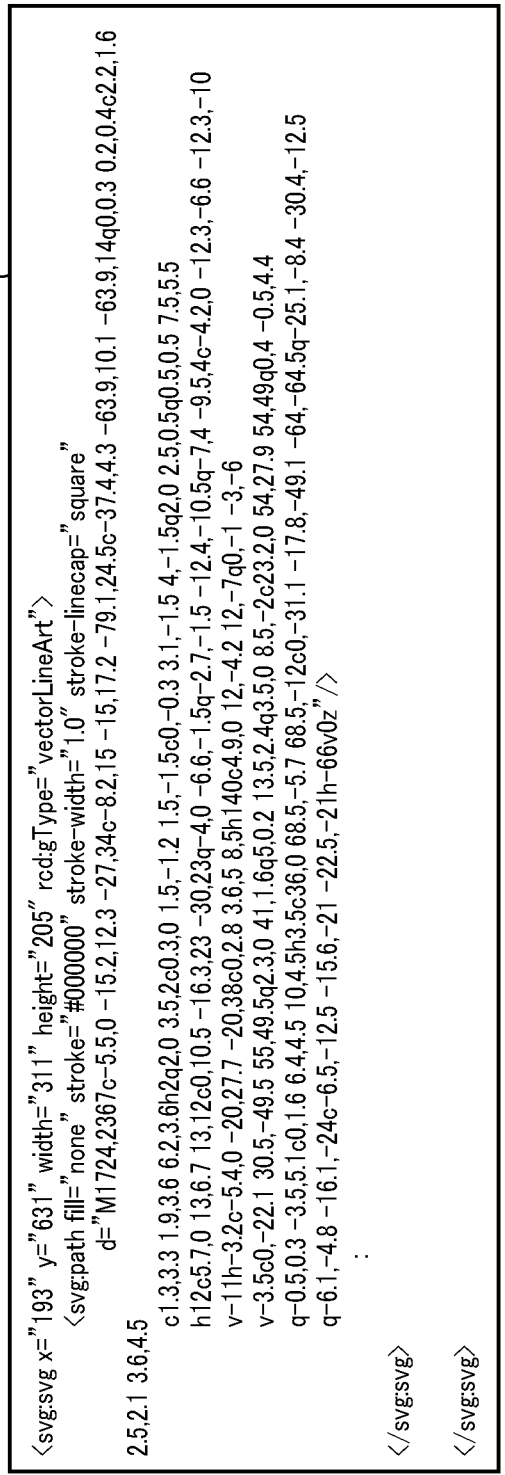

FIG. 18A and FIG. 18B shows an exemplary format of application image data. In the present embodiment, a description will be given by using the Scalable Vector Graphics (hereinafter referred to as "SVG") format as the format of the application image data.

In FIG. 18, notations for objects are enclosed by frames 1801, 1802, and 1804 for description. Each object has region information indicating a region of the object, and a rendering element acquired from actual data in the DAOF. Further, objects having only the region information and no rendering element (e.g., H1, H2, V1, and V2 shown in FIG. 17) are also possible. Reference numeral 1801 denotes a photograph attribute. The photograph attribute indicates region information about a region of a photographic object and bitmap information as a rendering element. Reference numeral 1802 denotes a character attribute. The character attribute indicates vector data of a character object, and reference numeral 1803 denotes character code data obtained by the OCR processing in step S506 and its character size obtained by the vectorization processing in step S504. The typesetting direction (vertical writing or horizontal writing) of the character region obtained by the vectorization processing in step S504 can also be described. Reference numeral 1804 shown in FIG. 18B denotes a graphic object such as a line rendering.

Although, in the present embodiment, the application image data is described in the SVG format, the format is not limited thereto and may be any image format which enables describing and maintaining the meaning and structure of the document.

Figure 19:
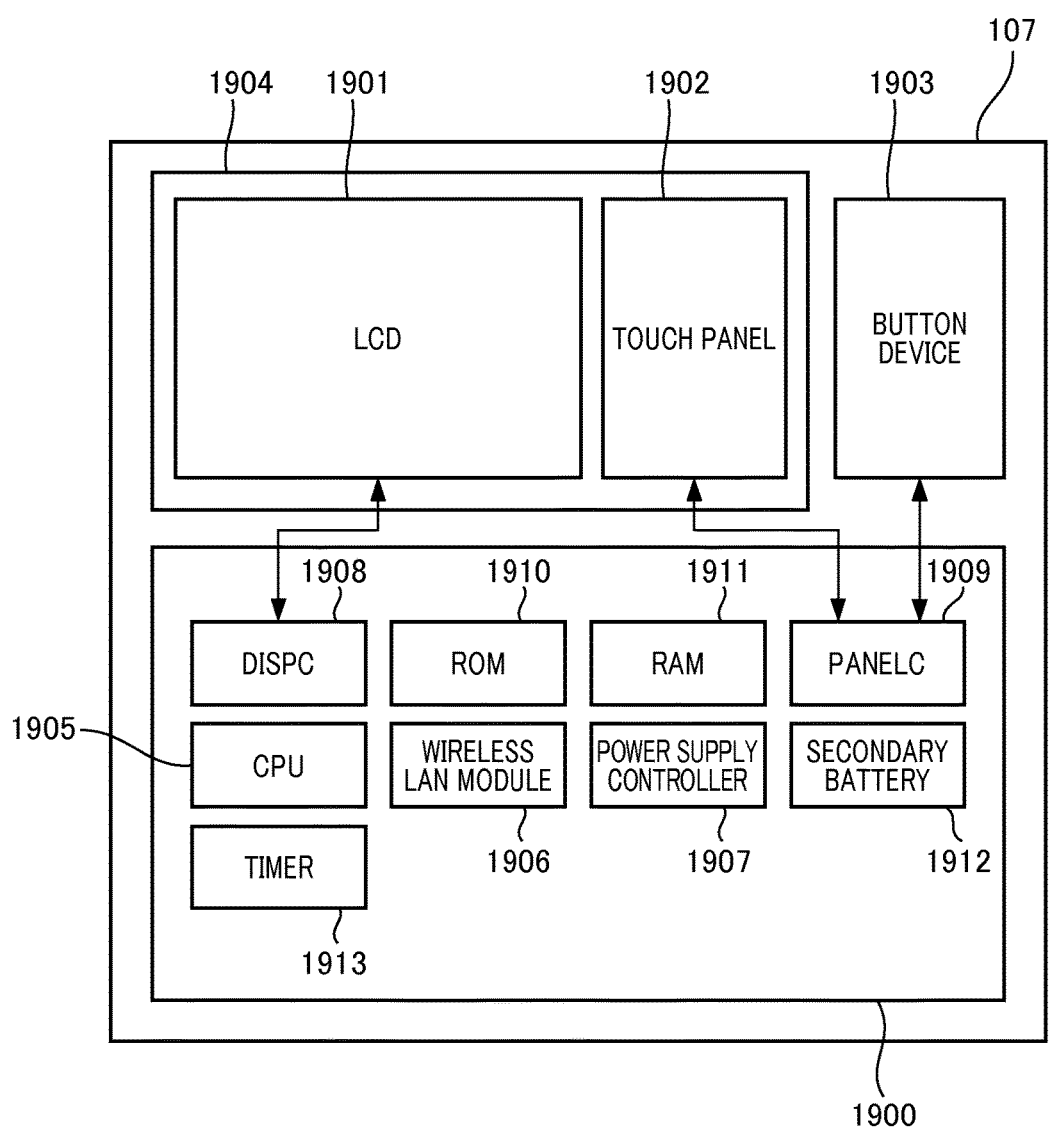
FIG. 19 is a block diagram illustrating a configuration of a mobile terminal.

FIG. 19 is a block diagram illustrating an exemplary hardware configuration of the mobile terminal 107 according to the present embodiment. The mobile terminal 107 is constituted by a main board 1900, a liquid crystal display (LCD) 1901, a touch panel 1902, and a button device 1903. The LCD 1901 and the touch panel 1902 are collectively referred to as a touch UI 1904.

The main board 1900 mainly includes a central processing unit (CPU) 1905, a wireless LAN module 1906, a power supply controller 1907, a display controller (DISPC) 1908, a panel controller (PANELC) 1909, a read-only memory (ROM) 1910, a random access memory (RAM) 1911, a secondary battery 1912, and a timer 1913. The modules 1905 to 1913 are connected with each other via a bus (not shown).

The CPU 1905 is a processor that controls each device connected to the bus and executes the software module 2000 (to be described below with reference to FIG. 20) stored in the ROM 1910 by expanding on the RAM 1911. The RAM 1911 functions as a main memory and a work area for the CPU 1905, an area for video image to be displayed on the LCD 1901, and a storage area of the application image data transmitted from the MFP 100.

The display controller (DISPC) 1908 switches video image output expanded on the RAM 1911 at high speed and outputs a synchronizing signal to the LCD 1901 in response to a request from the CPU 1905. As a result, the video image in the RAM 1911 is output to the LCD 1901 in synchronization with the synchronizing signal of the DISPC 1908, and a relevant image is displayed on the LCD 1901.

The panel controller (PANELC) 1909 controls the touch panel 1902 and the button device 1903 in response to a request from the CPU 1905. With this control, a position pressed on the touch panel 1902 by the finger or a pointing device (stylus pen) and the key code of a key pressed on the button device 1903 are notified to the CPU 1905. Information about the pressed position includes a coordinate value (hereinafter referred to as "x-coordinate") indicating the absolute position on the touch panel 1902 in the horizontal direction and a coordinate value (hereinafter referred to as "y-coordinate") indicating the absolute position thereon in the vertical direction. The touch panel 1902 is capable of detecting positions of a plurality of pressed points and notifying information about the pressed positions for the number of pressed points to the CPU 1905.

The power supply controller 1907 is connected with an external power supply (not shown) to receive the power supplied therefrom. The power supply controller 1907 supplies the power to the entire mobile terminal 107 while charging the secondary battery 1912 connected to the power supply controller 1907. When the power is not supplied from the external power supply, the secondary battery 1912 supplies the power to the entire mobile terminal 107.

The wireless LAN module 1906, under the control of the CPU 1905, establishes wireless communication with wireless LAN modules on wireless access points (not shown) connected to the LAN 102 to serve as an intermediate for communication with the devices shown in FIG. 1 such as the mobile terminal 107, the MFP 100, and the like. An example of the wireless LAN module 1906 is IEEE802.11b.

Figure 20:
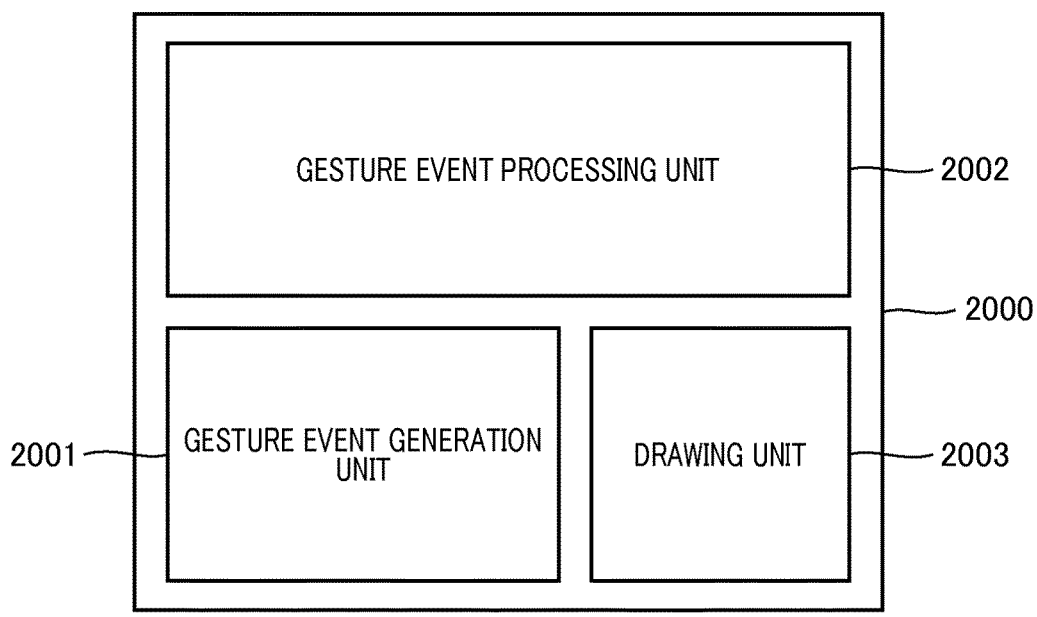
FIG. 20 is a block diagram illustrating a software module configuration of the mobile terminal.

The timer 1913 generates a timer interrupt to a gesture event generation unit 2001 shown in FIG. 20 under the control of the CPU 1905. The gesture event generation unit 2001 will be described below. A geomagnetic sensor and an acceleration sensor (none of which are shown) are also provided in the mobile terminal 107 and connected to a bus. The timer 1913 detects the inclination of the mobile terminal 107 under the control of the CPU 1905. When the inclination of the mobile terminal 107 is equal to or greater than a predetermined value, the timer 1913 changes the orientation of the mobile terminal 107, and sends an instruction for performing rendering on the LCD 1901 to a rendering unit 2003. When the timer 1913 changes the orientation of the mobile terminal 107, the CPU 1905 switches the width and height of the LCD 1901 to thereby perform the subsequent processing.

FIG. 20 is a block diagram illustrating a configuration of the software module 2000 executed by the CPU 1905 of the mobile terminal 107. A description will be given of modules constituting the software module 2000. As shown in FIG. 20, the software module 2000 includes a gesture event generation unit 2001, a gesture event processing unit 2002, and a rendering unit 2003.

The gesture event generation unit 2001 generates various gesture events to be described below in response to a user's touch input. The gesture event generation unit 2001 transmits a generated gesture event to the gesture event processing unit 2002. Upon reception of the gesture event generated by the gesture event generation unit 2001, the gesture event processing unit 2002 executes processing based on the received gesture event and the document structure described in the application image data. The rendering unit 2003 draws and displays the application image data transmitted from the MFP 100 based on a result of execution by the gesture event processing unit 2002 on the LCD 1901. A method for displaying the application image data will be described below.

FIGS. 21A, 21B, 21C, 21D, 21E, 21F, 21G, 21H, 21I, 21J, 21K, and 21L illustrate names of gesture events generated by the gesture event generation unit 2001 and information about each event to be transmitted from the gesture event generation unit 2001 to the gesture event processing unit 2200.

FIG. 21A illustrates a touch press event. When this event occurs, the latest coordinate values of the touch coordinates and the latest touch coordinate number are transmitted to the gesture event processing unit 2200. The touch coordinates refer to coordinates for one point on the touch panel 1902 on which the user's finger touches and has a pair of coordinate values represented by X- and Y-coordinates. The touch coordinate number indicates the number of touch coordinates on the touch panel 1902 on which the user's finger touches. The touch coordinates are updated when the user's finger touches the touch panel 1902, when the finger moves thereon, when the finger separates therefrom, and when an interrupt from the timer 1913 occurs.

FIG. 21B illustrates a swipe event. When this event occurs, coordinate values of the latest touch coordinates, and a moving distance calculated based on a difference between the latest and last coordinate values are transmitted to the gesture event processing unit 2200. Here, a swipe refers to a motion of moving the fingertip in any one direction (similar to a sliding motion) while keeping in contact with the touch panel 1902.

FIG. 21C illustrates a pinch-in event. When this event occurs, center coordinate values of the latest touch coordinates of two points and a pinch-in reduction rate calculated based on a reduced distance of a straight line connecting the touch coordinates of the two points are transmitted to the gesture event processing unit 2200. Here, a pinch-in refers to a motion of bringing the two fingertips mutually close (similar to a nipping motion) while keeping in contacted with the touch panel 1902.

FIG. 21D illustrates a pinch-out event. When this event occurs, center coordinate values of the latest touch coordinates of two points and a pinch-out enlargement rate calculated based on an enlarged distance of a straight line connecting the touch coordinates of the two points are transmitted to the gesture event processing unit 2200. Here, a pinch-out refers to a motion of bringing the two fingertips mutually apart (similar to a widening motion) while keeping in contacted with the touch panel 1902.

FIG. 21E illustrates a two-point swipe event. When this event occurs, coordinate values of the latest touch coordinates of two points and a moving distance calculated based on a difference between the latest and last coordinate values of the touch coordinates of the two points are transmitted to the gesture event processing unit 2200. The two-point swipe event occurs when touch coordinates of the two points move in the same direction.

FIG. 21F illustrates a rotate event. When this event occurs, rotation center coordinate values calculated based on the latest touch coordinates of two points and a rotational angle calculated based on the latest and last coordinate values of the touch coordinates of the two points are transmitted to the gesture event processing unit 2200. Here, a rotate refers to a motion of rotating the two fingertips with respect to the touch panel 1902 while keeping in contact therewith.

FIG. 21G illustrates a flick event. When this event occurs, coordinate values of the latest touch coordinates and a moving speed of the finger calculated based on the latest and last coordinate values are transmitted to the gesture event processing unit 2200. Here, a flick refers to a motion of separating from the touch panel 1902 (similar to a bouncing motion) during the swipe operation.

FIG. 21H illustrates a touch release event. When this event occurs, coordinate values of the latest touch coordinates when the user's finger separates from the touch panel 1902, and the number of coordinates are transmitted to the gesture event processing unit 2200.

FIG. 21I illustrates a double-tap event. When this event occurs, coordinate values of the latest touch coordinates are transmitted to the gesture event processing unit 2200. Here, a double-tap refers to an event in which a single-tap event to be described below occurs within a predetermined time duration.

FIG. 21J illustrates a single-tap event. When this event occurs, coordinate values of the latest touch coordinates are transmitted to the gesture event processing unit 2200. Here, a single-tap refers to an event in which the above-described touch press event occurs and subsequently the touch release event occurs within a predetermined time duration.

FIG. 21K illustrates a long-tap event. When this event occurs, coordinate values of the latest touch coordinates are transmitted to the gesture event processing unit 2200. Here, a long-tap refers to an event in which the above-described touch press event occurs and, after a predetermined time duration has elapsed, the touch release event occurs.

FIG. 21L illustrates a touch-and-hold event. When this event occurs, coordinate values of the latest touch coordinates are transmitted to the gesture event processing unit 2200. Here, a touch-and-hold refers to an event in which, since the user's finger touches the touch panel 1902, a predetermined time duration has elapsed keeping in contact therewith without moving.

Although, in the above-described examples, the user uses own finger for touch input, a stylus pen may be used for touch input.

Figure 22:
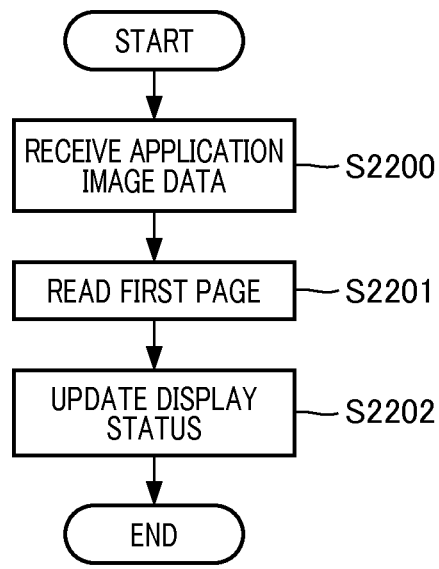
FIG. 22 is a flowchart illustrating processing executed when the mobile terminal receives the application image data.
Figure 23:
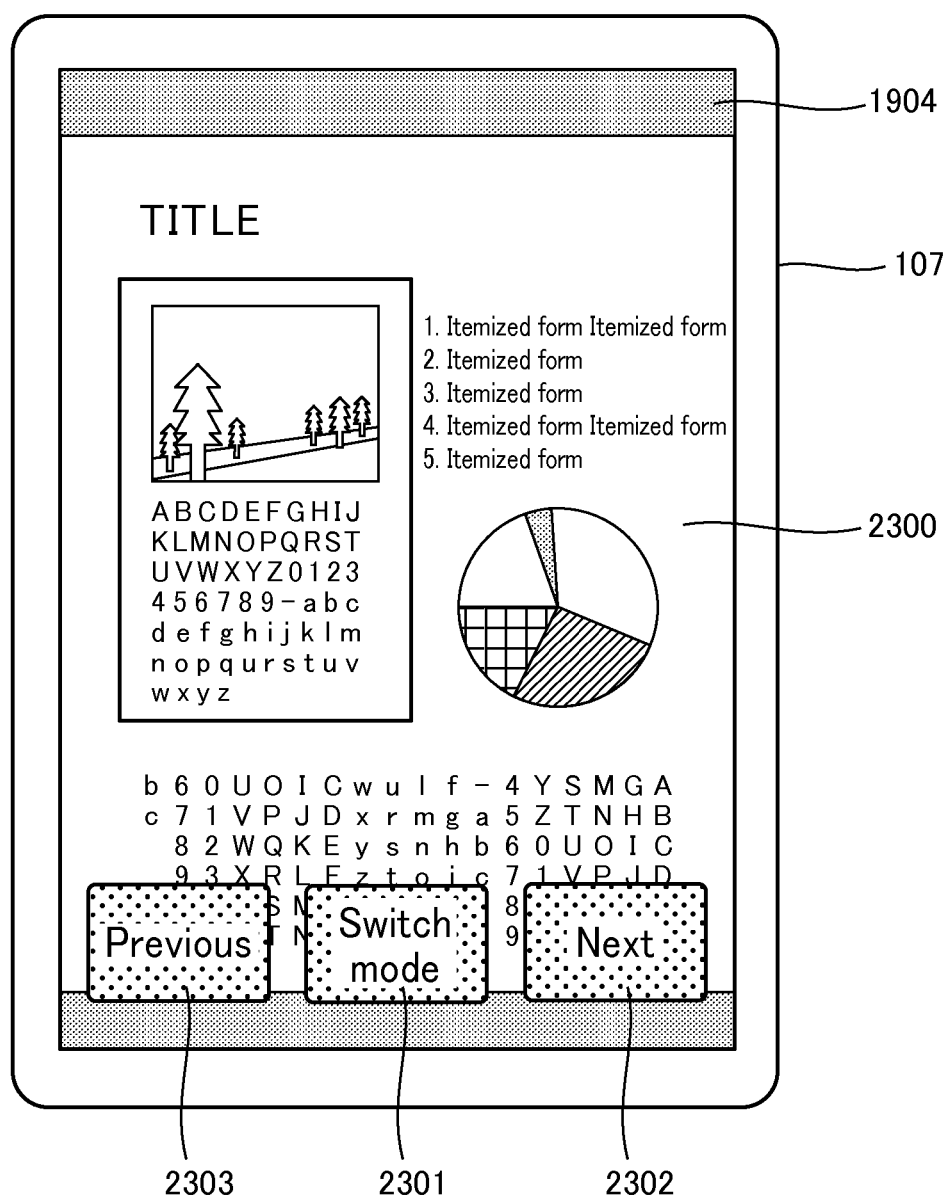
FIG. 23 illustrates an exemplary screen display of a touch user interface (UI) of the mobile terminal.

Next, a description will be given of processing performed by the mobile terminal 107 upon reception of the application image data according to the present embodiment with reference to FIGS. 22 and 23. FIG. 22 is a flowchart illustrating processing executed by the mobile terminal 107 upon reception of the application image data. FIG. 23 illustrates an example of screen display of the touch UI 1904 of the mobile terminal 107.

In step S2200, the mobile terminal 107 receives the application image data from the MFP 100 via the wireless LAN module 1906, and stores the received application image data in the RAM 1911. Next, in step S2201, the rendering unit 2003 analyzes the syntax of the application image data stored in the RAM 1911, and reads the first page and objects contained therein.

Next, in step S2202, the rendering unit 2003 renders all of objects (background, character, photograph, and graphic) contained in the read first page according to the starting point coordinates, width, and height of each object to update the display status of the touch UI 1904. In this case, as shown in a page 2300 in FIG. 23, the mobile terminal 107 controls the display magnification for the first page according to the width of the touch UI 1904. When the height of the page (when reduced to the display magnification) is smaller than the height of the touch UI 1904, the mobile terminal 107 controls the starting point of the page 2300 in the coordinates on the touch UI 1904 so that the page is adapted to be displayed at the center of the touch UI 1904. On the other hand, when the height of the page 2300 (when reduced to the display magnification) is larger than the height of the touch UI 1904, the mobile terminal 107 controls the starting point of the page 2300 in the coordinates on the touch UI 1904 so that the starting point is aligned with the starting point of the touch UI 1904 (e.g., the top left corner of the screen). In the present embodiment, a display control method in which the entire page is displayed on the touch UI 1904 in this way is referred to as "page display mode".

As shown in the character attribute 1802 in FIG. 18, the character object contained in the application image data of the present embodiment has vector data and the character code data 1803. When there is a character object in a page, the rendering unit 2003 renders the page 2300 only by using vector data, whereas the rendering unit 2003 renders a character-wrapped image to be described below by using character code data.

Figure 24:
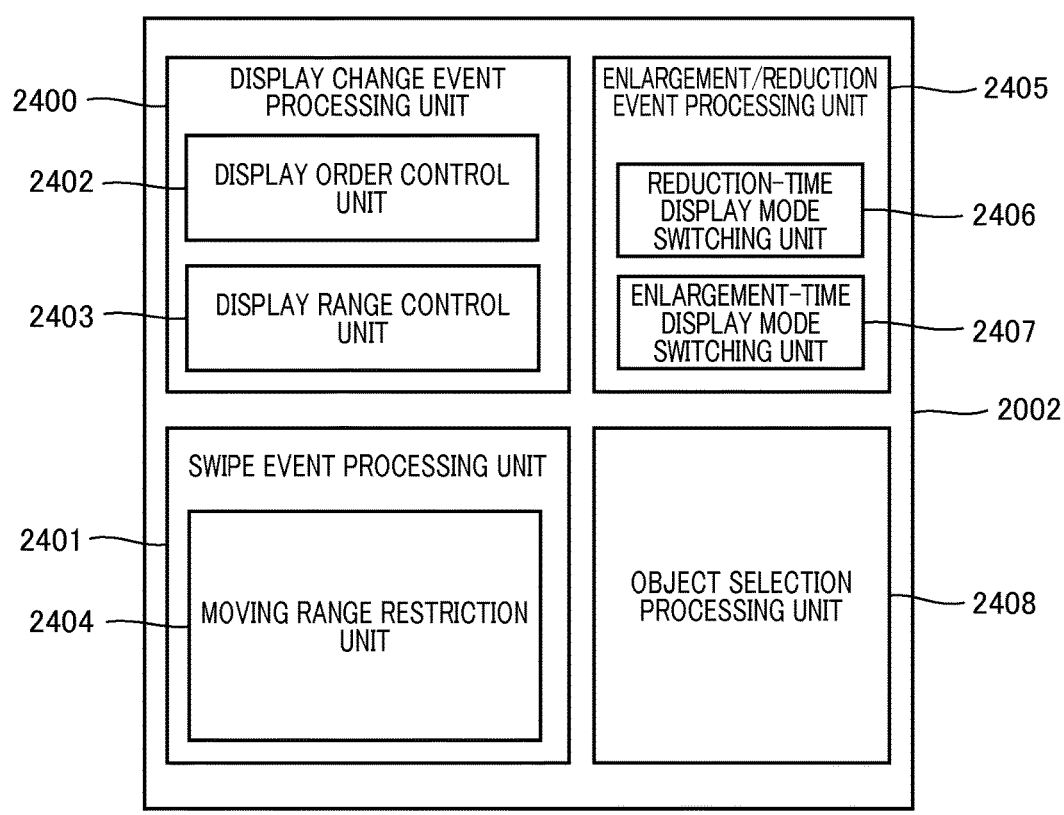
FIG. 24 is a block diagram illustrating a software module configuration related to operation control of the application image data.

Next, a description will be given of software modules related to operation control of the application image data of the mobile terminal 107 with reference to FIGS. 23 and 24. FIG. 24 is a block diagram illustrating a software module configuration in the gesture event processing unit 2002 related to operation control of the application image data. The gesture event processing unit 2002 includes a display change event processing unit 2400, a swipe event processing unit 2401, an enlargement/reduction event processing unit 2405, and an object selection processing unit 2408.

The gesture event processing unit 2002 receives any one of gesture events shown in FIG. 21 from the gesture event generation unit 2001. The display change event processing unit 2400 processes the single-tap event (FIG. 21J) among the gesture events received by the gesture event processing unit 2002. Upon reception of the single-tap event, the display change event processing unit 2400 determines whether or not coordinate values of the touch coordinates of the single-tap event correspond to any one of a "CHANGE MODE" button 2301, a "NEXT" button 2302, and a "PREVIOUS" button 2303 shown in FIG. 23. When touch coordinates of the single-tap event correspond to the "CHANGE MODE" button 2301, the display change event processing unit 2400 performs "mode switch processing" to be described below. When touch coordinates of the single-tap event correspond to the "NEXT" button 2302, the display change event processing unit 2400 performs "NEXT selection processing" ("NEXT" button selection processing) to be described below. When touch coordinates of the single-tap event correspond to the "PREVIOUS" button 2303, the display change event processing unit 2400 performs "PREVIOUS selection processing" ("PREVIOUS" button selection processing) to be described below. The "NEXT selection processing" and the "PREVIOUS selection processing" are performed by a display order control unit 2402 and a display range control unit 2403 provided in the display change event processing unit 2400.

The swipe event processing unit 2401 processes the swipe event shown in FIG. 21B. Upon reception of the swipe event, the gesture event processing unit 2002 moves the starting points of both the page 2300 and a character-wrapped image to be described below in the coordinates on the touch UI 1904 according to the moving distance included in swipe event information. Then, the gesture event processing unit 2002 updates the display status of the touch UI 1904. A moving range restriction unit 2404 provided in the swipe event processing unit 2401 performs moving range restriction processing to be described below with reference to FIG. 30 to thereby restrict the moving range of a partial region displayed on the touch UI 1904.

The enlargement/reduction event processing unit 2405 processes the pinch-in event shown in FIG. 21C and the pinch-out event shown in FIG. 21D. Upon reception of the pinch-in event or the pinch-out event, the gesture event processing unit 2002 changes the character sizes of both the page 2300 and a character-wrapped image to be described below upon rendering according to the reduction rate or the enlargement rate of the two events, respectively. The enlargement/reduction event processing unit 2405 updates the display status of the touch UI 1904 by using the changed image. A reduction-time display mode switching unit 2406 provided in the enlargement/reduction event processing unit 2405 performs reduction-time display mode switch processing to be described below with reference to FIG. 34. An enlargement-time display mode switching unit 2407 provided in the enlargement/reduction event processing unit 2405 performs enlargement-time display mode switch processing to be described below with reference to FIG. 31.

The object selection processing unit 2408 processes the double-tap event shown in FIG. 21I. Upon reception of the double-tap event, the gesture event processing unit 2002 performs object selection processing to be described below with reference to FIG. 32 by using coordinate values of the touch coordinates of the double-tap event. The object selection processing is controlled by the object selection processing unit 2408 so that the processing is operated only in the page display mode.

Figure 25:
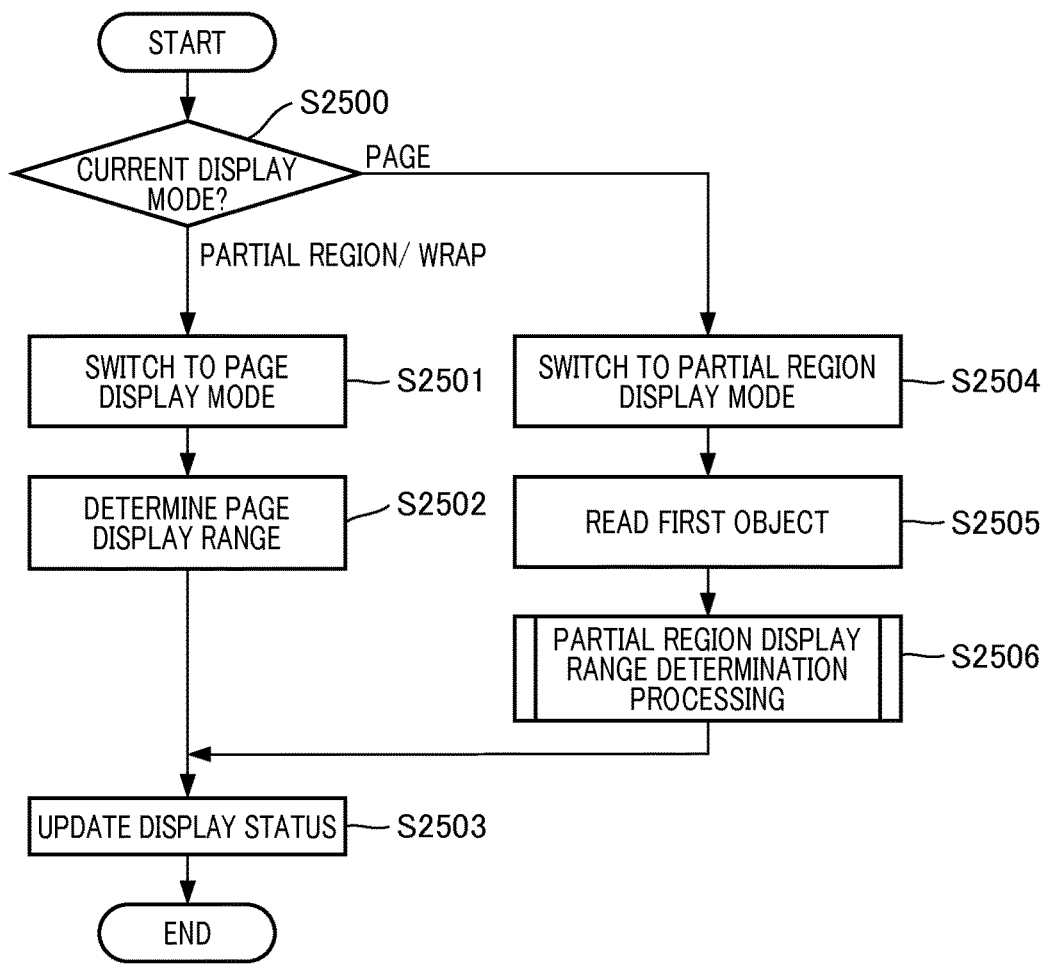
FIG. 25 is a flowchart illustrating mode switch processing.

Next, a description will be given of the mode switch processing performed by the display change event processing unit 2400 with reference to FIGS. 23, 25, 26, and 33. FIG. 25 is a flowchart illustrating the mode switch processing. The mode switch processing is executed when the "CHANGE MODE" button 2301 which is the display mode switching item shown in FIG. 23 or FIG. 26B is tapped by the user. FIGS. 26 and 33 illustrate examples of screen display of the touch UI 1904 of the mobile terminal 107.

In step S2500, the display change event processing unit 2400 acquires the display mode set in the mobile terminal 107 when the display change event processing unit 2400 determines that the "CHANGE MODE" button is tapped by the user. The display mode refers to a method used by the mobile terminal 107 to display the application image data on the touch UI 1904. In the present embodiment, the mobile terminal 107 has the following three display modes as an example. The first display mode is the page display mode suitable for displaying the entire page as shown in FIG. 23. The second display mode is the partial region display mode suitable for enlarging and displaying a partial region in the page as shown in FIG. 26B. Specifically, the partial region display mode is the first display mode for enlarging and displaying each object in the page image. The third display mode is the wrapped-display mode (second display mode) suitable for reading characters in the character object as shown in FIG. 33B. As shown in FIG. 33B, the wrapped-display mode is the display mode for rendering character code data of the character object according to the size of the touch UI 1904. The display mode can transition to the wrapped-display mode when the character object having character code data is highlighted in the partial region display mode. The details of the wrapped-display mode will be described below. As described above, the page display mode is set immediately after the mobile terminal 107 receives the application image data. As shown in FIG. 26B, the partial region display mode is a display mode in which the display magnification and the starting point of the page 2300 are controlled so that each object in the page 2300 is enlarged and displayed.

Figure 26A:
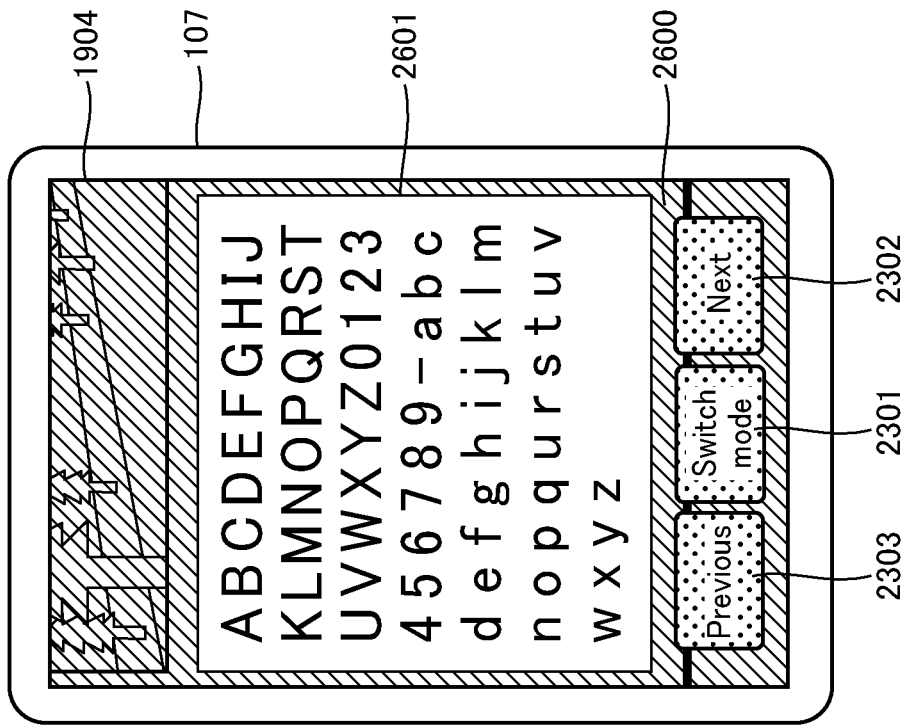
FIGS. 26A and 26B illustrate examples of screen display of the touch UI of the mobile terminal.
Figure 26B:
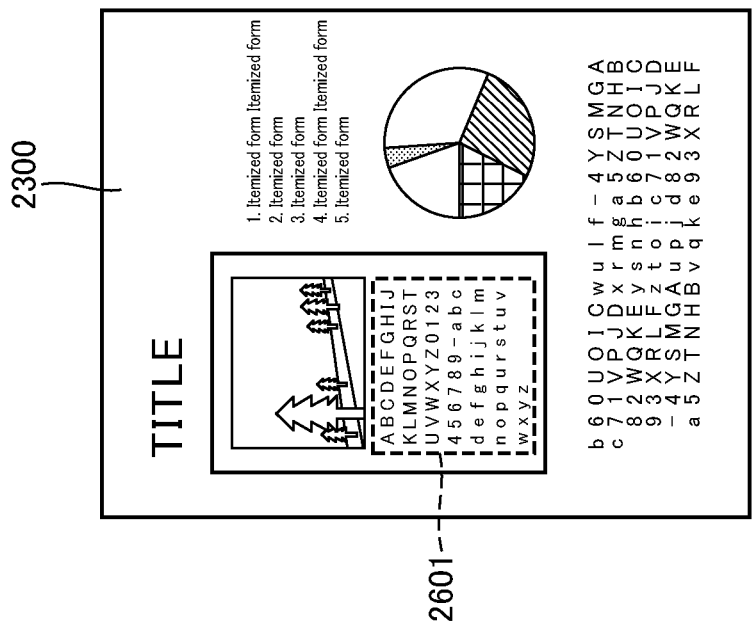

A display event processing unit 2400 may switch the display mode in step S2500 when the character object 2601 shown in FIG. 26A is single-tapped by the user. Alternatively, the display event processing unit 2400 may display the screen shown in FIG. 26A when the "CHANGE MODE"

button 2301 shown in FIG. 23 is pressed by the user to thereby cause the user to select an object to be enlarged. When the character object 2601 is selected by the user as an object to be enlarged and displayed, the image shown in FIG. 26B is displayed.

A broken line surrounding the object 2601 shown in FIG. 26A is drawn to help facilitate understanding of the description, and does not actually exist on the page 2300. In the present embodiment, as shown in FIG. 26B, a region for the object to be enlarged and displayed is transparent, a semi-transparent mask 2600 of semi-transparent gray shown by hatching is displayed on the regions other than the object 2600 by superimposing. By displaying the semi-transparent mask 2600 and the object 2601 with contrast as described above, only the target object is made easily viewable. In other words, superimposing such a semi-transparent mask enables highlighting the target object and dimly displaying objects other than the target object, allowing the user to easily identify the region of the object to be displayed.

When the display mode set when the "CHANGE MODE" button 2301 is tapped is the partial region display mode or the wrapped-display mode, the processing proceeds to step S2501, whereas when the display mode at that time is the page display mode, the display change event processing unit 2400 executes processing in step S2504.

In step S2501, the display change event processing unit 2400 sets not to display the semi-transparent mask 2600 shown in FIG. 26B (semi-transparent mask OFF), and switches the display mode to the page display mode for displaying the entire page image. In step S2502, the display change event processing unit 2400 controls the display magnification of the page 2300 according to the width of the touch UI 1904, as described above, and controls the starting point of the page 2300 to thereby determine the page display range. In step S2503, the display change event processing unit 2400 updates the display status of the touch UI 1904 based on the determined page display range.

When the display mode set when the "CHANGE MODE" button 2301 is tapped is the page display mode, in step S2504, the display change event processing unit 2400 switches the display mode to the partial region display mode. Then, the display change event processing unit 2400 sets to display the semi-transparent mask 2600 (semi-transparent mask ON).

Next, in step S2505, the display change event processing unit 2400 reads the first object in the page 2300, and acquires the starting point, width, and height of the first object. Here, the first object refers to an object which is read first in the document structure tree of the application image data.

In step S2506, the display range control unit 2403 in the display change event processing unit 2400 performs partial region display range determination processing to be described below. In step S2503, the display range control unit 2403 updates the display status of the touch UI 1904 based on the determined partial region display range. In the partial region display range determination processing in step S2506, the display change event processing unit 2400 controls the display magnification and the starting point of the page according to the attribute of the object read in step S2505 to thereby determine a display range of the partial region to be displayed on the touch UI 1904. The partial region display range determination processing will be described in detail below. In this case, a semi-transparent (gray) mask is applied to regions other than the partial region of the object to be displayed, allowing the user to easily identify the object to be displayed.

Figure 27:
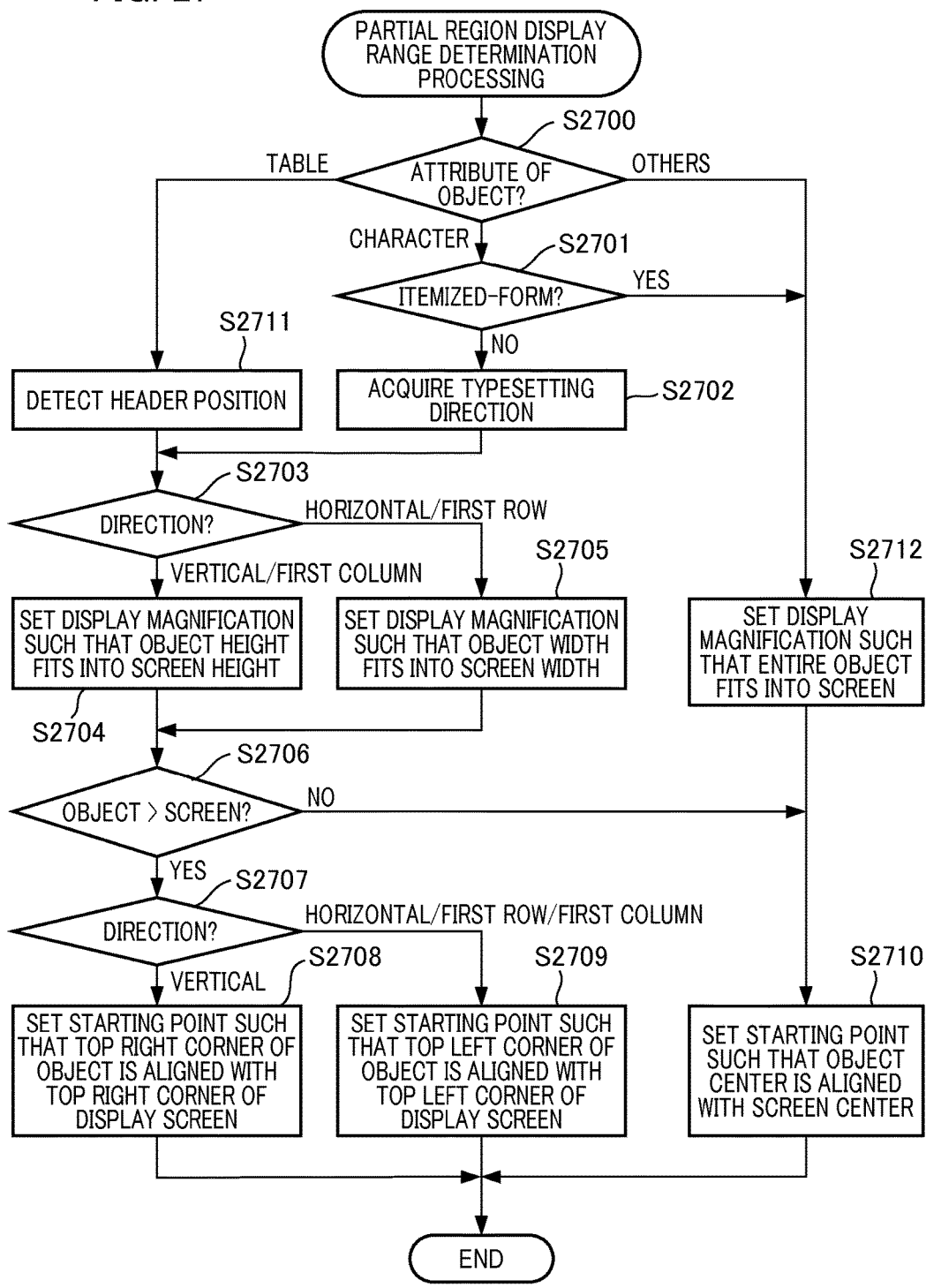
FIG. 27 is a flowchart illustrating partial region display range determination processing.

Next, a detailed description will be given of the partial region display range determination processing performed by the display range control unit 2403 in step S2506 shown in FIG. 25 with reference to the flowchart shown in FIG. 27. In step S2700, the display range control unit 2403 determines the attribute of the read object. When the attribute is determined to be character, the processing proceeds to step S2701. When the attribute is determined to be table, the processing proceeds to step S2711. On the other hand, when the attribute is determined to be others, the processing proceeds to step S2712.

In step S2701, the display range control unit 2403 determines whether or not the object to be displayed having the character attribute is in itemized form. An object in itemized form refers to an object having a point or numeral as a line head character for each character string or row. The line head character can be acquired from the result of the OCR processing. When the object is determined not to be in itemized form but to be an ordinary character string, the processing proceeds to step S2702. On the other hand, when the object is determined to be in itemized form, the processing proceeds to step S2712.

In step S2702, the display range control unit 2403 acquires the typesetting direction of characters in the object. The typesetting direction of the object has been acquired in the vectorization processing in step S504. In step S2703, the display range control unit 2403 determines the typesetting direction of characters. When the typesetting direction is vertical, the processing proceeds to step S2704. On the other hand, when the typesetting direction is horizontal, the processing proceeds to step S2705. When the typesetting direction of characters is vertical, in step S2704, the display range control unit 2403 sets the display magnification of the page such that the height of the relevant object fits into the height of the screen of the touch UI 1904. When the typesetting direction of characters is horizontal, in step S2705, the display range control unit 2403 sets the display magnification of the page such that the width of the relevant object fits into the width of the screen of the touch UI 1904.

Next, in step S2706, the display range control unit 2403 determines whether or not the entire object which has been reduced to the display magnification set in step S2704 or S2705 can be displayed on the touch UI 1904. When the entire object is determined to be larger than the touch UI 1904 and the entire object cannot be displayed thereon, the processing proceeds to step S2707. On the other hand, when the entire object is determined to be smaller than the touch UI 1904 and the entire object can be displayed thereon, the processing proceeds to step S2710.

In step S2707, the display range control unit 2403 determines the typesetting direction of characters in the relevant object. When the typesetting direction of characters is determined to be vertical, the processing proceeds to step S2708. On the other hand, when the typesetting direction of characters is determined to be horizontal, the processing proceeds to step S2709.

In step S2708, the display range control unit 2403 sets the starting point position of the page 2300 such that the top right corner of the relevant object is aligned with the top right corner of the touch UI 1904 since the entire object displays the vertical character region which cannot be displayed on the touch UI 1904. Specifically, the display range control unit 2403 sets the display position such that the first row for vertical writing is displayed.

In step S2709, the display range control unit 2403 sets the starting point of the page 2300 such that the top left corner of the relevant object is aligned with the top left corner of the touch UI 1904 since the entire object displays the horizontal writing character region which cannot be displayed on the touch UI 1904. Specifically, the display range control unit 2403 sets the display position such that the first row for horizontal writing is displayed.

In step S2710, since the entire object fits into the screen of the touch UI 1904, the display range control unit 2403 sets the starting point of the page 2300 such that the center of the relevant object is aligned with the center of the touch UI 1904.

When the attribute of the object is determined to be table in step S2700, in step S2711, the display range control unit 2403 detects a header position of the table. The header position can be determined, for example, based on whether or not the font type of the character of the first row (top row) and the first column (leftmost column) is bold, the thickness of the approximation curve of the vector data at the time of vectorization, the thickness of the table ruled line, the background color of each cell in the table, and the like. When the header position of the table detected in step S2711 is determined to be the first row, the processing proceeds to step S2705 from step S2703. When the header position of the table is determined to be the first column, the processing proceeds to step S2704 from step S2703. Since the table header commonly exists at the top row or leftmost column in step S2707, the processing proceeds to step S2709. In step S2709, the display range control unit 2403 sets the starting point of the page such that the top left corner of the object is aligned with the top left corner of the touch UI. Thus, the display position is set such that the table header is displayed. Specifically, the display range control unit 2403 functions as a setting unit in the aforementioned processing. When the attribute of the object is character or table, the display range control unit 2403 sets the display magnification and the display position of the first object such that the range of characters in the typesetting direction fits into the screen.

When the attribute of the object is determined to be others (attributes other than character and table) in step S2700 or when the object is determined to be in itemized form in step S2701, the display range control unit 2403 performs the following processing in step S2712. Specifically, the display range control unit 2403 sets the display magnification of the page such that the entire relevant object fits into the touch UI 1904. In step S2710, the display range control unit 2403 sets the starting point of the page 2300 such that the center of the object is aligned with the center of the touch UI 1904.

Figure 28:
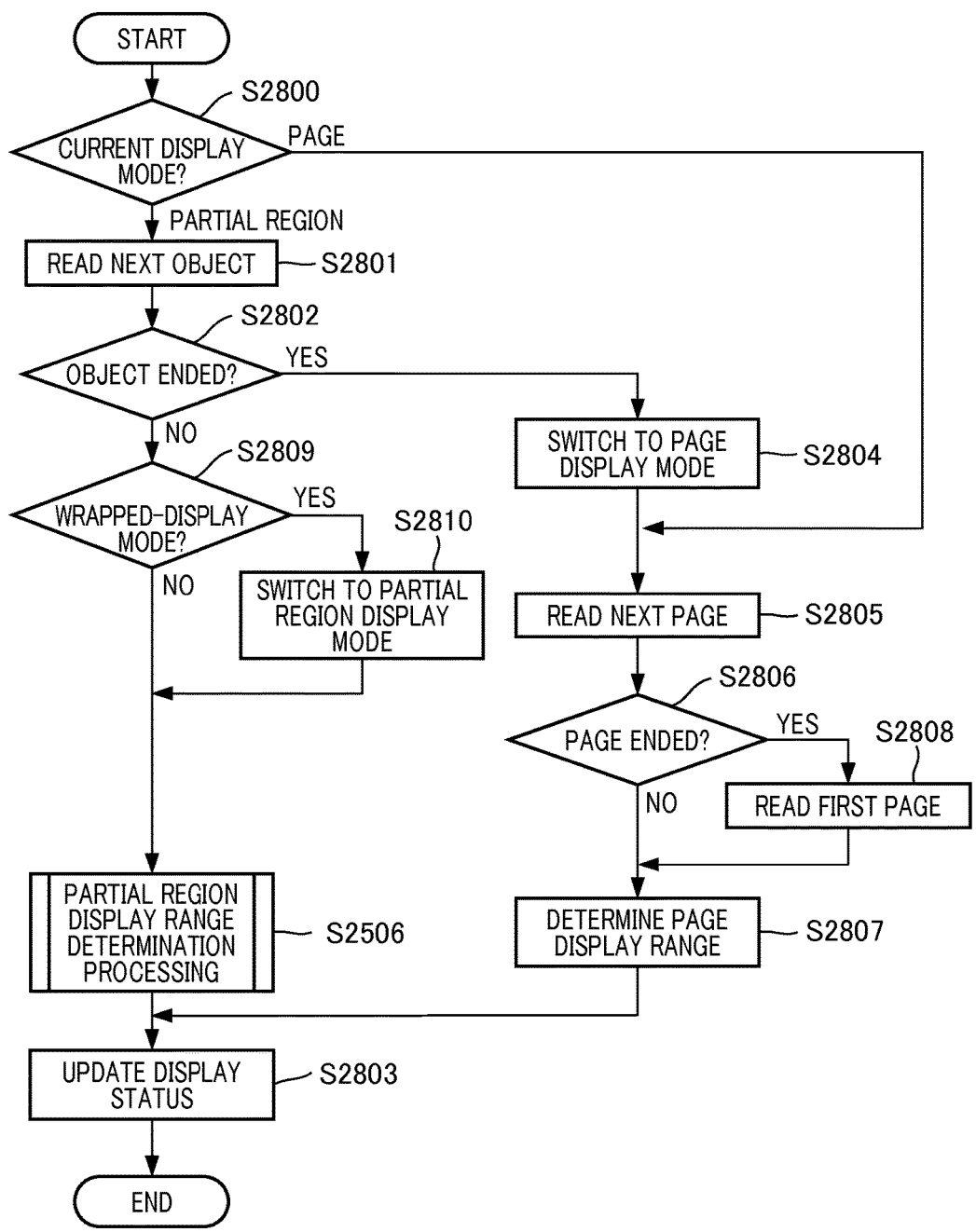
FIG. 28 is a flowchart illustrating NEXT selection processing.

A description will be given of the "NEXT selection processing ("NEXT" button selection processing)" executed when the "NEXT" button 2302 is tapped (instructed) by the user with reference to the flowchart shown in FIG. 28.

In step S2800, the display change event processing unit 2400 acquires the display mode set in the mobile terminal 107 when the "NEXT" button 2302 serving as a next processing item is tapped. When the acquired display mode is the partial region display mode, the processing proceeds to step S2801. When the acquired display mode is the page display mode, the processing proceeds to step S2805.

In step S2801, the display order control unit 2402 selects a next display target object based on the document structure tree from among all of the objects of the currently read page, and reads the relevant object. In the present embodiment, objects on the document tree structure are displayed from the first highest hierarchical level downward, specifically, in order of an object belonging to the first highest hierarchical level, an object belonging to the second hierarchical level, and so on. When all of objects belonging to the next lower hierarchical levels have been displayed, objects are displayed from another higher hierarchical level downward, specifically, in order of an object belonging to the next higher hierarchical level, an object belonging to the lower hierarchical level under the next higher hierarchical level, and so on.

For example, in FIG. 17, V0 denotes a page and H1 denotes an object which is read first. When the "NEXT selection processing" is performed in a state where the object H1 is displayed on the touch UI 1904 in the partial region display mode, the object H1 has a lower hierarchical level, and thus, an object T1 is read. Furthermore, when the "NEXT selection processing" is performed in a state where the object T1 is displayed, the object T1 does not have a lower hierarchical level and an object T2 exists in the same hierarchical level as the object T1, and thus, the object T2 is read. When the "NEXT selection processing" is performed in a state where the object T2 is displayed, the object T2 does not have a lower hierarchical level and no more object exists in the relevant hierarchical level, and thus, an object S1 belonging to the next higher hierarchical level is read. Although, in the present embodiment, the object H1 not having a rendering element is selected and read, it goes without saying that only the rendering elements T1 and T2 having a rendering element may be selected. Also, only an object having a specific attribute, for example, an object having the "character" attribute may be selected, or only an object having a specific attribute may be excluded. Furthermore, only an object such as H1 or V1 not having a rendering element itself but having a rendering element in a lower hierarchical level may be selected.

In step S2802, the display order control unit 2402 determines whether or not the next object has been read in step S2801. When the next object is determined to have been read in step S2801 (when a selectable object exists), the processing proceeds to step S2809 to process the read object.

When the display mode acquired in step S2800 is the wrapped-display mode in step S2809, the display order control unit 2402 displays the semi-transparent mask 2600 and switches the display mode to the partial region display mode in step S2810. When the display mode acquired in step S2800 is not the wrapped-display mode, the processing proceeds to step S2506. The partial region display range determination processing in step S2506 is similar to the processing described with reference to FIG. 27, and thus, redundant description thereof will be omitted. In step S2803, the display order control unit 2402 updates the display status of the touch UI 1904 by using the display magnification and the starting point of the page controlled based on the attribute, starting point, width, and height of the read object.

On the other hand, when the next object is determined not to have been read in step S2801 (when no selectable object exists), the last object in the page has already been read. Thus, the display order control unit 2402 determines that the display processing is completed for all objects in step S2802, and the processing proceeds to step S2804. In step S2804, the display order control unit 2402 ends the partial region display mode, sets not to display the semi-transparent mask 2600, and switches the display mode to the page display mode.

In step S2805, since the display mode is the page display mode, the display order control unit 2402 analyzes the syntax of the application image data stored in the RAM 1911, and reads the next page and objects contained therein.

In step S2806, the display order control unit 2402 determines whether or not the next page has been read. When the next page has been read in step S2805, the processing proceeds to step S2807. On the other hand, when the last page of the application image data stored in the RAM 1911 has already been read and there is no next readable page in step S2805, the processing proceeds to step S2808. In step S2808, the display order control unit 2402 analyzes the syntax of the application image data stored in the RAM 1911, and reads the first page and objects contained therein.

Next, in step S2807, the display range control unit 2403 controls the display magnification of the page according to the width of the touch UI 1904 as described above and controls the starting point of the page to thereby determine the page display range. In step S2803, the display range control unit 2403 updates the display status of the touch UI 1904 based on the determined page display range.

Figure 29:
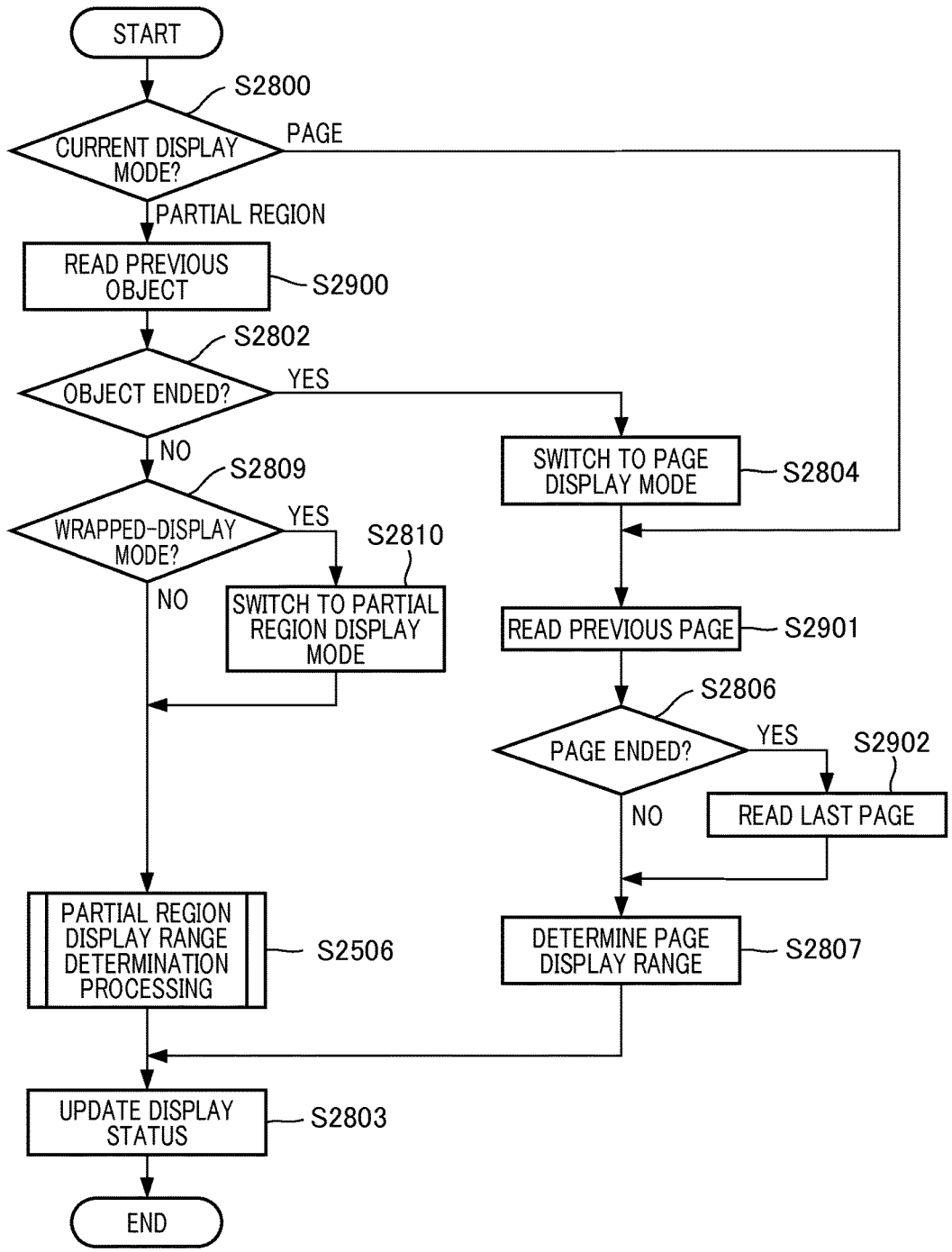
FIG. 29 is a flowchart illustrating PREVIOUS selection processing.

Next, a description will be given of the "PREVIOUS" selection processing ("PREVIOUS" button selection processing)" executed when the "PREVIOUS" button 2303 is tapped (instructed) by the user with reference to the flowchart shown in FIG. 29. The PREVIOUS selection processing has almost the same configuration as the NEXT selection processing, and redundant description thereof will be omitted and only different portions (steps S2900, S2901, and S2902) will be described below.

When the current display mode is the partial region mode, the display order control unit 2402 selects a next display target object based on the document structure tree from among all of the objects of the currently read page, and reads the relevant object in step S2900. In the present embodiment, when the "PREVIOUS" button 2303 is tapped, objects on the document tree structure are displayed from the lowest hierarchical level upward, specifically, in order of objects belonging to the lowest hierarchical level, objects belonging to the second lowest hierarchical level, and so on. Specifically, when all of objects belonging to a lower hierarchical level have been displayed, other objects belonging to the higher hierarchical level are displayed.

For example, in FIG. 17, a last object T7 belonging to the lowest hierarchical level is read first. In the partial region display mode, when the "PREVIOUS" button 2302 serving as a PREVIOUS processing item is tapped in a state where the object T7 is displayed on the touch UI 1904, an object T6 existing in the same hierarchical level is read. Furthermore, when the "PREVIOUS selection processing" is performed in a state where the object T6 is displayed, an object V2 belonging to the higher hierarchical level is read since no other objects exist in the same hierarchical level. When the "PREVIOUS selection processing" is performed in a state where the object V2 is displayed, a last object T5 belonging to the lower hierarchical level of the object V1 is read since an object V1 exists in the same hierarchical level and has objects in the lower hierarchical level.

Also in the "PREVIOUS selection processing", as in the "NEXT selection processing", it is also possible to select only objects having a rendering element, select only objects having a specific attribute, or select objects by excluding only objects having a specific attribute. Furthermore, only an object such as H1 or V1 not having a rendering element itself but having a rendering element in a lower hierarchical level may be selected.

In step S2901, since the display mode is the page display mode, the display order control unit 2402 analyzes the syntax of the application image data stored in the RAM 1911, and reads the previous page and objects contained therein. In step S2806, the first page of the application image data stored in the RAM 1911 has already been read. When there is no next readable page in step S2901, the display order control unit 2402 analyzes the syntax of the application image data stored in the RAM 1911, and reads the last page and objects contained therein in step S2902.

Figure 30:
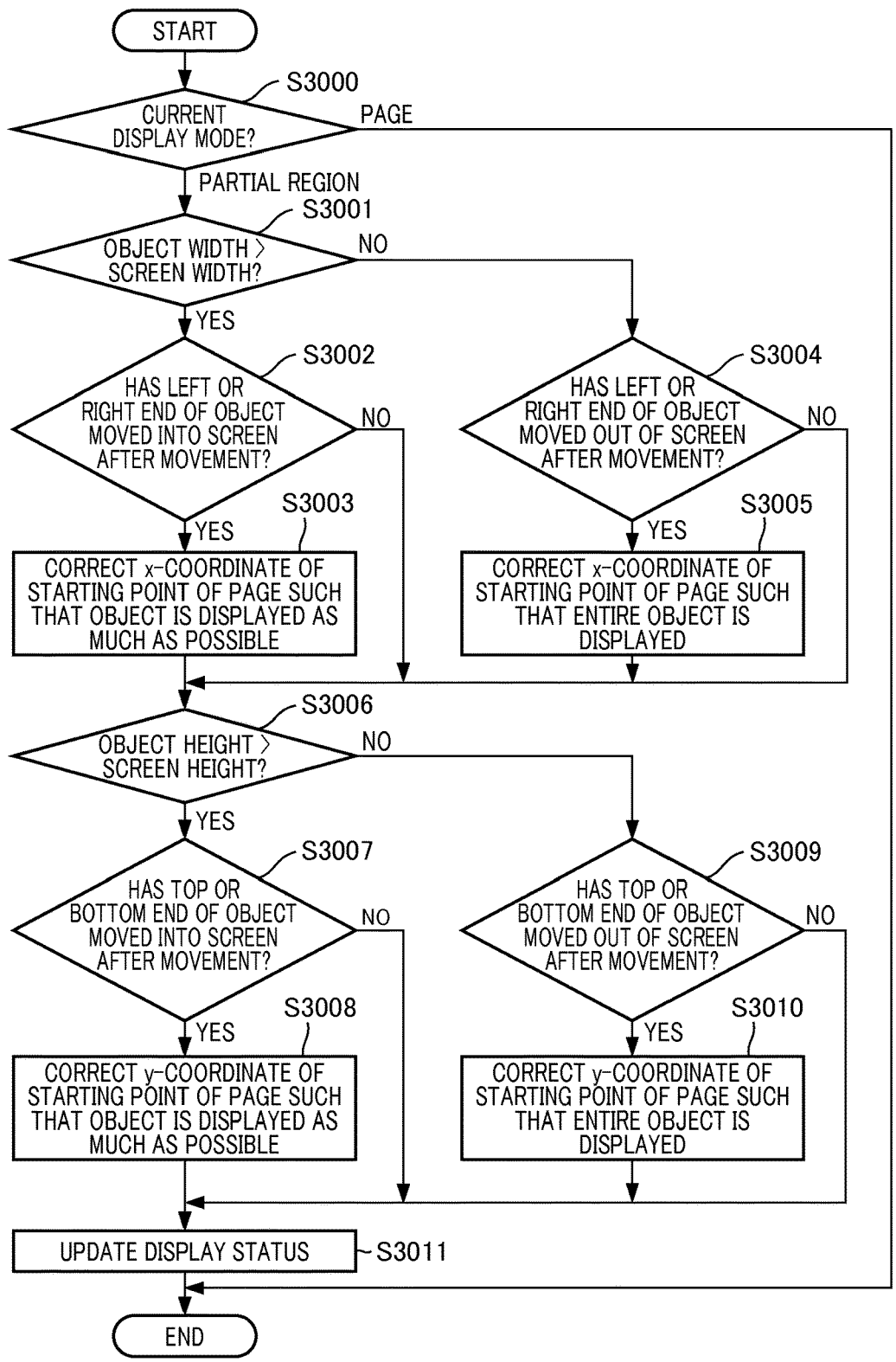
FIG. 30 is a flowchart illustrating moving range restriction processing.

Next, a description will be given of the moving range restriction processing performed by the moving range restriction unit 2404 of the swipe event processing unit 2401 with reference to the flowchart shown in FIG. 30. In step S3000, the moving range restriction unit 2404 acquires the display mode set in the mobile terminal 107 when the swipe operation is performed, and determines the current display mode. When the moving range restriction unit 2404 determines that the display mode is the partial region display mode, the processing proceeds to step S3001. When the moving range restriction unit 2404 determines that the display mode is the page display mode, the processing ends without performing any processing.

When the display mode is determined to be the partial region display mode in step S3000, the processing proceeds to step S3001. In step S3001, the moving range restriction unit 2404 determines whether or not the width of the currently read object when displayed with the display magnification for the current page is larger than the width of the screen of the touch UI 1904 (the width of the display region in the screen). When the width of the relevant object is larger than the width of the screen of the touch UI 1904, the processing proceeds to step S3002. Otherwise, the processing proceeds to step S3004.

In step S3002, the moving range restriction unit 2404 performs the following determination when the swipe event processing unit 2401 moves the display position of the page containing the relevant object according to the moving distance of the swipe event. In other words, the moving range restriction unit 2404 determines whether or not the left or right end of the object has moved into the screen of the touch UI 1904. Consequently, when the left or right end of the object is determined to be within the screen of the touch UI 1904, the processing proceeds to step S3003. Otherwise, the processing proceeds to step S3006.

In step S3003, the moving range restriction unit 2404 corrects the x-coordinate of the starting point of the page to move the left or right end of the relevant object, which has moved into the screen, respectively to the left or right end of the screen of the touch UI 1904 so that the relevant object is displayed as much as possible.

On the other hand, when the swipe event processing unit 2401 moves the display position of the page containing the relevant object according to the moving distance of the swipe event in step S3004, the moving range restriction unit 2404 determines whether or not the left or right end of the object has moved out of the screen of the touch UI 1904. Consequently, when the left or right end of the relevant object is determined to be out of the screen of the touch UI 1904, the processing proceeds to step S3005. Otherwise, the processing proceeds to step S3006.

In step S3005, the moving range restriction unit 2404 corrects the x-coordinate of the starting point of the page to move the left or right end of the relevant object respectively to the left or right end of the screen so that the entire relevant object is displayed. When the size of the object is equal to or less than that of the screen, the user's visibility is improved by the correction. In step S3006, the moving range restriction unit 2404 determines whether or not the height of the currently read object when displayed with the display magnification for the current page is larger than the height of the screen of the touch UI 1904. When the height of the relevant object is determined to be larger than the screen height of the touch UI 1904, the processing proceeds to step S3007. Otherwise, the processing proceeds to step S3009.

In step S3007, the moving range restriction unit 2404 determines whether or not the top or bottom end of the object has moved into the screen of the touch UI 1904 when the swipe event processing unit 2401 moves the display position of the page containing the relevant object according to the moving distance of the swipe event. Consequently, when the top or bottom end of the object is determined to be within the screen of the touch UI 1904, the processing proceeds to step S3008. Otherwise, the processing proceeds to step S3011.

In step S3008, the moving range restriction unit 2404 corrects the Y-coordinate of the starting point of the page to move the top or bottom end of the relevant object, which has moved into the screen, respectively to the top or bottom end of the screen so that the relevant object is displayed as much as possible.

When the height of the relevant object is determined not to be larger than the screen height of the touch UI 1904 in step S3006, the processing proceeds to step S3009. In step S3009, the moving range restriction unit 2404 determines whether or not the top or bottom end of the object has moved out of the screen of the touch UI 1904 when the swipe event processing unit 2401 moves the display position of the page containing the relevant object according to the moving distance of the swipe event. When the top or bottom end of the object is determined to have moved out of the screen of the touch UI 1904, the processing proceeds to step S3010. Otherwise, the processing proceeds to step S3011.

In step S3010, the moving range restriction unit 2404 corrects the y-coordinate of the starting point of the page to move the top or bottom end of the relevant object into the screen so that the entire relevant object is displayed. Finally, in step S3011, the display change event processing unit 2400 updates the display status of the touch UI 1904 according to the display magnification and the starting point of the page.

As described above, the user can recognize the entire object as much as possible even when the moving distance of the swipe event is large by restricting the moving range of the object.

Figure 31:
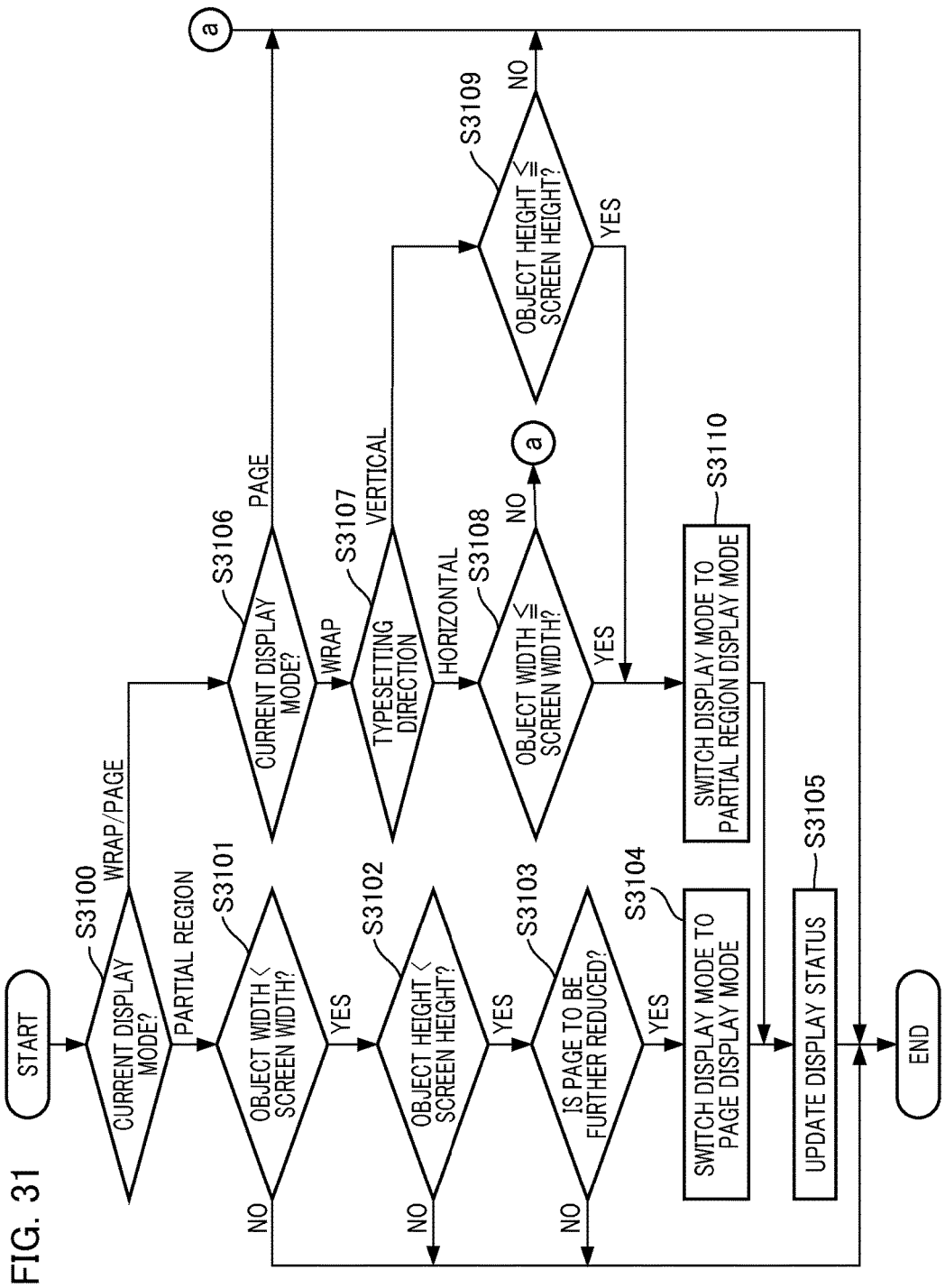
FIG. 31 is a flowchart illustrating reduction-time display mode switch processing.

Next, a description will be given of the reduction-time display mode switch processing performed by the reduction-time display mode change unit 2406 of the enlargement/reduction event processing unit 2405 when the pinch-in operation is performed with reference to the flowchart shown in FIG. 31. In step S3100, the reduction-time display mode switching unit 2406 acquires the display mode set in the mobile terminal 107 when an operation to instruct the reduction processing is performed by the user. When the acquired display mode is the partial region display mode, the processing proceeds to step S3101. When the acquired display mode is the wrapped-display mode or the page display mode, the processing proceeds to step S3106.

In step S3101, the reduction-time display mode switching unit 2406 determines whether or not the width of the currently read object when displayed with the display magnification for the current page is smaller than the width of the screen of the touch UI 1904. When the width of the relevant object is determined to be smaller than the width of the screen of the touch UI 1904, the processing proceeds to step S3102. Otherwise, the processing ends without performing the switch processing.

In step S3102, the reduction-time display mode switching unit 2406 determines whether or not the height of the currently read object when displayed with the display magnification for the current page is smaller than the height of the screen of the touch UI 1904. When the height of the relevant object is determined to be smaller than the screen height of the touch UI 1904, the processing proceeds to step S3103. Otherwise, the processing ends without performing the switch processing.

In step S3103, the reduction-time display mode change unit 2406 determines whether or not the display magnification of the page containing the relevant object is to be further reduced. Specifically, the reduction-time display mode change unit 2406 determines whether or not the received event is the pinch-in event. When the reduction-time display mode change unit 2406 determines that the page is to be further reduced, the processing proceeds to step S3104. Otherwise, the processing ends without performing any processing.

In step S3104, the reduction-time display mode switching unit 2406 sets not to display the semi-transparent mask 2600, and switches the display mode of the mobile terminal 107 from the partial region display mode to the page display mode. In other words, when the entire object is displayed within the screen in the partial region display mode and the pinch-in event is performed, the reduction-time display mode switching unit 2406 switches the display mode to the page display mode which is the third display mode. Finally, in step S3105, the display change event processing unit 2400 updates the display status of the touch UI 1904 according to the display magnification and the starting point of the page determined based on the pinch-in event.

In step S3106, the reduction-time display mode switching unit 2406 acquires the display mode set in the mobile terminal 107, and determines whether or not the display mode is the wrapped-display mode. When the display mode is the wrapped-display mode, the processing proceeds to step S3107. Otherwise, the processing ends without performing the switch processing.

In step S3107, the reduction-time display mode switching unit 2406 acquires the typesetting direction of characters contained in the object displayed in the wrapped-display mode. The typesetting direction of the object has been acquired in the vectorization processing in step S504. When the acquired typesetting direction of characters is horizontal, the processing proceeds to step S3108. When the acquired typesetting direction of characters is vertical, the processing proceeds to step S3109.

In step S3108, the reduction-time display mode switching unit 2406 determines whether or not the width of the currently read object when the display magnification of the page is changed according to the reduction rate of the received pinch-in event is equal to or less than the width of the screen of the touch UI 1904. When the width of the relevant object is equal to or less than the width of the screen of the touch UI 1904, the processing proceeds to step S3110. Otherwise, the processing ends without performing the switch processing.

In step S3109, the reduction-time display mode switching unit 2406 determines whether or not the height of the relevant object when the display magnification of the page is changed as in step S3108 is equal to or less than the height of the screen of the touch UI 1904. When the height of the relevant object is equal to or less than the screen height of the touch UI 1904, the processing proceeds to step S3110. Otherwise, the processing ends without performing the switch processing.

Next, in step S3110, the reduction-time display mode switching unit 2406 sets not to display a character-wrapped image to be described below but to display the semi-transparent mask 2600 and the page 2300, and switches the display mode of the mobile terminal 107 to the partial region display mode. Then, the display status of the touch UI 1904 is updated in step S3105.

Here, a detailed description will be given of the aforementioned wrapped-display mode and character-wrapped image with reference to FIG. 26 and FIG. 33. FIGS. 33A and 33B illustrate an example of screen display of the touch UI 1904 of the mobile terminal 107 according to the present embodiment.

Figure 33A:
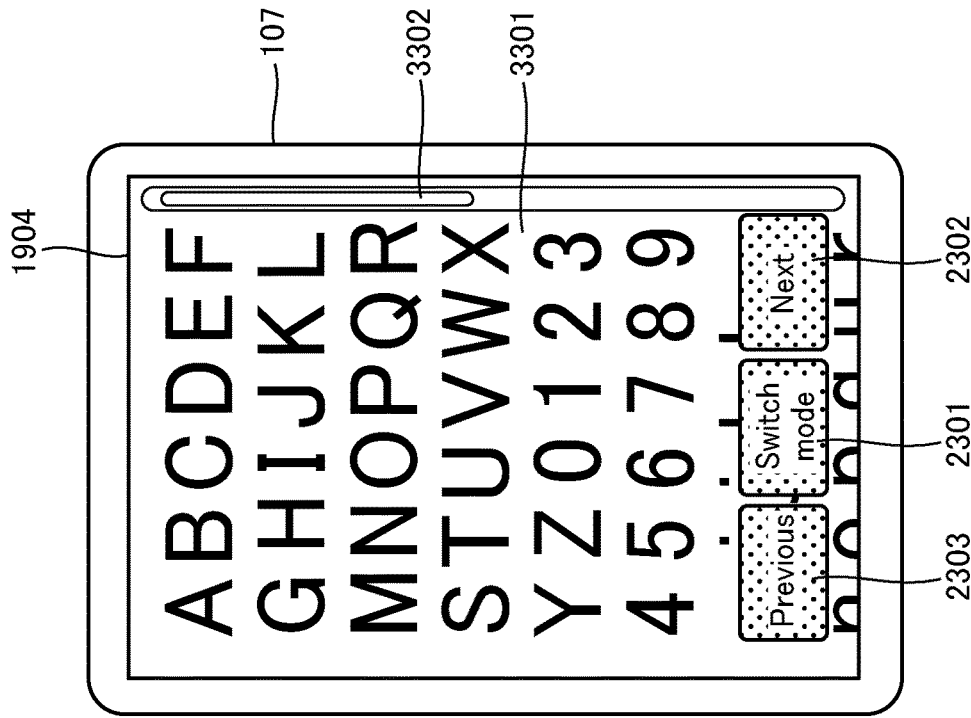
FIGS. 33A and 33B illustrate examples of screen display of the touch UI of the mobile terminal.
Figure 33B:
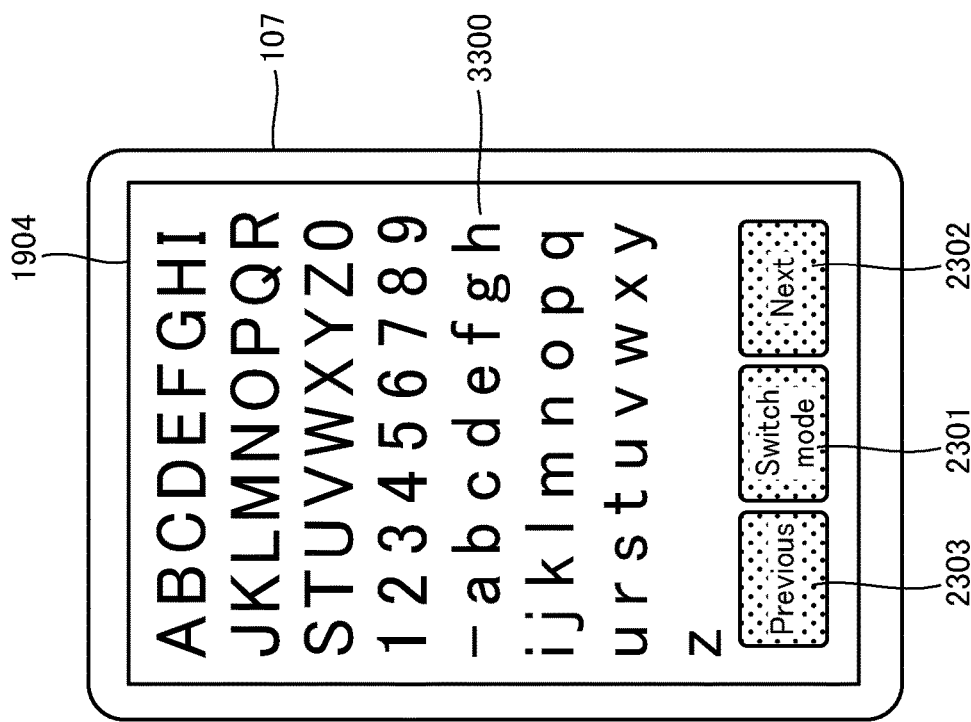

FIG. 33A shows an example in which the character object 2601 shown in FIG. 26B is displayed on the screen of the touch UI 1904 in the wrapped-display mode. In FIG. 33A, the page 2300 and the semi-transparent mask 2600 are not displayed but a character-wrapped image 3300 is displayed instead of them. The character-wrapped image 3300 is an image which is obtained by rendering the character code data of the object 2601 by the rendering unit 2003 of the mobile terminal 107 according to the size of the screen of the touch UI 1904.

The rendering unit 2003 renders the character code data in the desired size and orientation in accordance with the character size and the typesetting direction obtained in the course of vectorization processing and the display magnification of the page to be updated by the pinch-in event and the pinch-out event. Since the typesetting direction of characters in the object 2601 shown in FIG. 26B is horizontal, the character-wrapped image 3300 is rendered character-by-character or word-by-word in the typesetting direction for each row, and, when the rendered character reaches the right end of the screen of the touch UI 1904, the character is wrapped around to the next row and is rendered continuously. When the typesetting direction of characters is vertical, the rendering unit 2003 renders character-by-character or word-by-word in the typesetting direction for each column, and, when the rendered character reaches the bottom end of the screen of the touch UI 1904, the rendering unit 2003 generates a character-wrapped image with a character wrapped around to the next column.

FIG. 33B shows an example in which the character-wrapped image 3300 shown in FIG. 33A is further enlarged by a user's pinch-out operation. Although the character-wrapped image 3300 shown in FIG. 33A entirely fits into the screen, the display magnification of a character-wrapped image 3301 shown in FIG. 33B is larger than that of the character-wrapped image 3300 shown in FIG. 33A, so that the rendering unit 2003 cannot display the entire object so as to fit into the screen. In such a case, the rendering unit 2003 displays a slide bar 3302 on the screen of the touch UI 1904, so that a position relative to the entirety of the character-wrapped image 3300 which is currently displayed on the screen of the touch UI 1904 can be informed to the user. When the swipe event processing unit 2401 moves the character-wrapped image 3300, the rendering unit 2003 changes the display of the slide bar 3302 according to the moving distance.

Next, a description will be given of the enlargement-time display mode switch processing performed by the enlargement-time display mode switching unit 2407 when the pinch-out operation is performed with reference to the flowchart shown in FIG. 34. In step S3400, the enlargement-time display mode switching unit 2407 of the enlargement/reduction event processing unit 2405 acquires the display mode set in the mobile terminal 107 when an operation to instruct the enlargement processing is performed by the user. When the acquired display mode is the partial region display mode, the processing proceeds to step S3401. When the acquired display mode is not the partial region display mode, the processing ends without performing any processing.

In step S3401, the enlargement-time display mode switching unit 2407 determines the attribute of the currently read object. When the attribute of the object is character, the processing proceeds to step S3402. When the attribute of the object is not character, the processing ends without performing any processing.

In step S3402, the enlargement-time display mode switching unit 2407 determines whether or not the currently read object has character code data. When the currently read object has character code data, the processing proceeds to step S3403. When the currently read object does not have character code data, the processing ends without performing any processing.

In step S3403, the enlargement-time display mode switching unit 2407 acquires the typesetting direction of characters in the currently read object. The typesetting direction of the object has been acquired in the vectorization processing in step S504. When the acquired typesetting direction of characters is horizontal, the processing proceeds to step S3404. When the acquired typesetting direction of characters is vertical, the processing proceeds to step S3405.

In step S3404, the enlargement-time display mode switching unit 2407 determines whether or not the width of the currently read object when the display magnification of the page is changed according to the enlargement rate of the received pinch-out event is larger than the width of the screen of the touch UI 1904. When the width of the relevant object is larger than the width of the screen of the touch UI 1904, the processing proceeds to step S3406. Otherwise, the processing ends without performing any processing.

In step S3405, the enlargement-time display mode switching unit 2407 determines whether or not the height of the relevant object when the display magnification of the page is changed as in step S3404 is larger than the height of the screen of the touch UI 1904. When the height of the relevant object is larger than the screen height of the touch UI 1904, the processing proceeds to step S3406. Otherwise, the processing ends without performing any processing.

Next, in step S3406, the enlargement-time display mode switching unit 2407 sets not to display the semi-transparent mask 2600 and the page 2300 but to display the character-wrapped image, and switches the display mode of the mobile terminal 107 to the wrapped-display mode. Then, the display status of the touch UI 1904 is updated in step S3407.

In other words, in the present embodiment, when the size of an object having the "character" attribute does not fit into the screen with respect to the typesetting direction of characters in the enlargement-time display mode switch processing, the display mode is switched to the wrapped-display mode. This enables the user to read an object having the "character" attribute, for which the movement operation was needed in at least two directions upon reading characters by a user's enlargement instruction, with any display magnification by the movement operation in only one direction.

In the enlargement-time display mode switch processing of the present embodiment, the display mode of an object such as H1 or V1 not having a rendering element itself may be switched to the wrapped-display mode. In such a case, in step S3401, it is determined whether or not there are character objects in a lower hierarchical level. When these objects have character code data, the display mode of the mobile terminal 107 is switched to the wrapped-display mode in step S3402. At this time, the character code data of these objects is used for generating a character-wrapped image to be displayed on the screen of the touch UI 1904.

Figure 32:
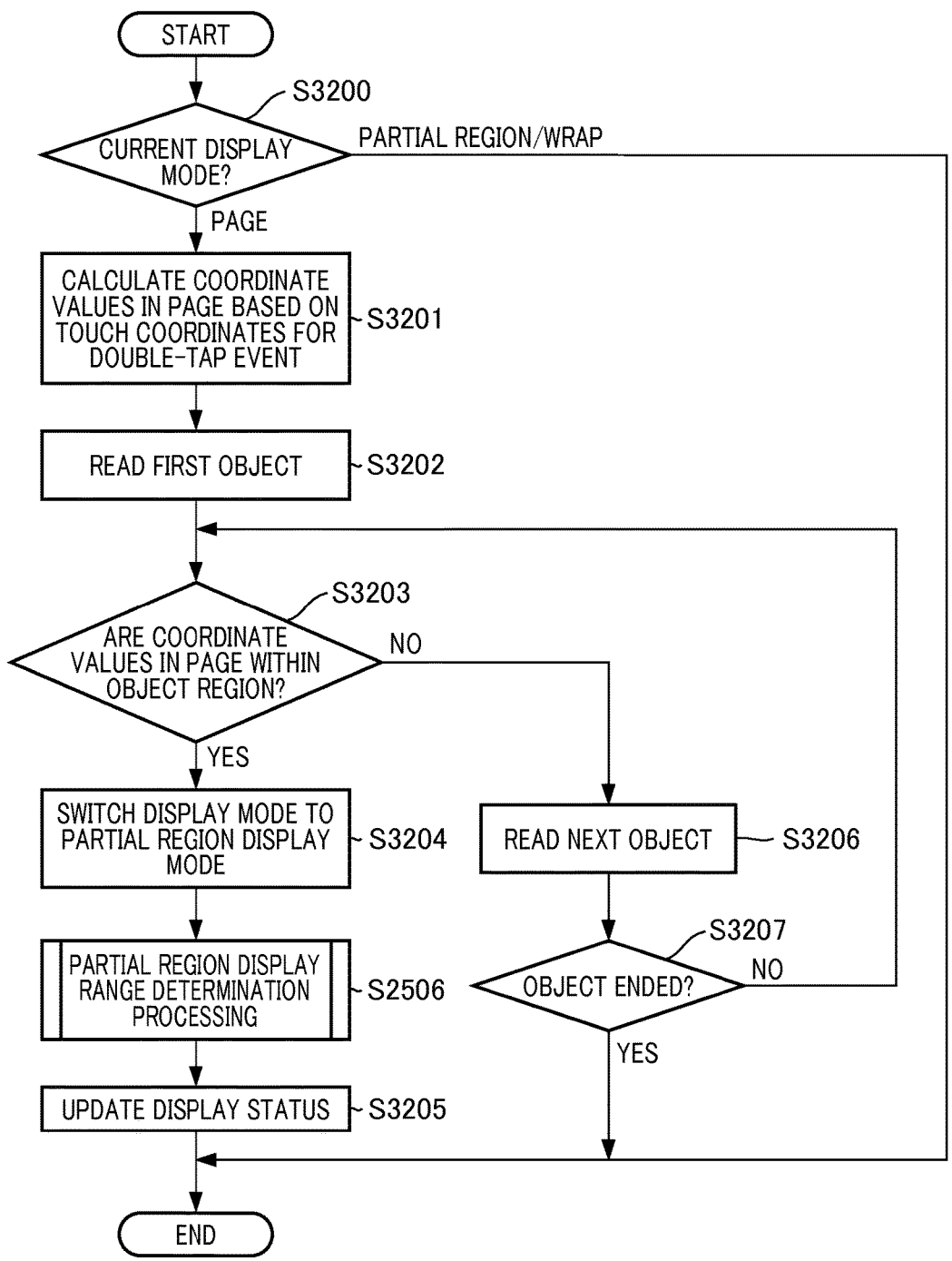
FIG. 32 is a flowchart illustrating object selection processing.

Next, a description will be given of the object selection processing with reference to the flowchart shown in FIG. 32. The object selection processing is processing that is executed by the object selection processing unit 2408 when the double-tap operation is performed by the user. In step S3200, the object selection processing unit 2408 acquires the display mode set in the mobile terminal 107 when the double-tap operation is performed by the user. When the acquired display mode is the page display mode, the processing proceeds to step S3201. When the acquired display mode is the partial region display mode, the processing ends without performing any processing.

In step S3201, the object selection processing unit 2408 acquires coordinate values of the touch coordinates for the received double-tap event. Since the coordinate values of the touch coordinates are coordinate values on the touch UI 1904, the object selection processing unit 2408 converts them into coordinate values in the page based on the display magnification and the starting point of the page displayed on the touch UI 1904.

In step S3202, the object selection processing unit 2408 reads information about the first object from among all of objects in the current page displayed on the touch UI 1904. In step S3203, the object selection processing unit 2408 determines whether or not coordinate values in the page acquired in step S3201 are included in the region information of the read object. When the coordinate values in the page are included in the region information of the read object, the processing proceeds to step S3204. Otherwise, the processing proceeds to step S3206.

In step S3204, the object selection processing unit 2408 switches the display mode of the mobile terminal 107 from the page display mode to the partial region display mode. At the same time, the object selection processing unit 2408 displays the semi-transparent mask 2600 to apply a semi-transparent mask to the regions other than the double-tapped object, and the processing proceeds to step S2506.

In step S2506, the object selection processing unit 2408 performs the partial region display range determination processing for the object (i.e., the double-tapped object) read in step S3202 or S3206. The partial region display range determination processing is as described above, and redundant description thereof will be omitted.

In step S3205, the display change event processing unit 2400 updates the display status of the touch UI 1904 according to the display magnification and the starting point of the page determined in the partial region display range determination processing.

On the other hand, in step S3206, the object selection processing unit 2408 reads information about an object next to the currently read object from among all of objects in the current page.

In step S3207, the object selection processing unit 2408 determines whether or not the next object has been read in step S3206. When the next object is determined to have been read, the processing returns to step S3203. Otherwise, when the next object is determined not to have been read, the processing ends without performing any processing.

Although, in the present embodiment, the object selection processing unit 2408 determines whether or not the coordinate values in the page are included in the region information of each object for all of objects in the page currently displayed on the touch UI 1904, the processing is not limited thereto. For example, as in the PREVIOUS selection processing and the NEXT selection processing, it is also possible to ignore objects not having a rendering element and select only objects having a rendering element. Furthermore, it is also possible to select only objects having a specific attribute (such as objects having the character attribute) and select objects by excluding only objects having a specific attribute. Furthermore, an object not having a rendering element itself but having a rendering element in a lower hierarchical level may also be selected.

Next, a specific description will be given of display processing in the partial region display mode and the wrapped-display mode according to the present embodiment with reference to FIGS. 26, 33, 35, and 36. FIGS. 35 and 36 illustrate examples of screen display of the touch UI 1904 of the mobile terminal 107 according to the present embodiment.

In FIG. 26A, the object 2601 is an object having the character attribute for horizontal writing. The object 2601 has region information enclosed by the broken line shown in FIG. 26A. Since the object 2601 has the character attribute, immediately after the object 2601 is read in the partial region display mode, the display magnification of the page is set to a magnification with which the width of the relevant object fits into the screen width of the touch UI 1904 in the partial region display range determination processing. In the case of the object 2601, the height of the relevant object is also smaller than the height of the screen of the touch UI 1904 with the set display magnification of the page. Thus, the rendering unit 2003 sets the starting point of the page such that the center of the relevant object is aligned with the center of the touch UI 1904 and displays the page as shown in FIG. 26B.

FIG. 33A illustrates an example of screen display of the object 2601 in the wrapped-display mode, where the character-wrapped image 3300 is displayed on the screen of the touch UI 1904. In FIG. 26B, the object 2601 is highlighted in the partial region display mode. When the user performs the pinch-out operation for the touch UI 1904 in this state, the enlargement-time display mode switch processing is executed. When the typesetting direction of characters in the object 2601 is horizontal and the width of the relevant object which is changed according to the enlargement rate of the pinch-out event is larger than the width of the screen of the touch UI 1904 as described above, the display mode shifts to the wrapped-display mode shown in FIG. 33A.

FIG. 33B illustrates an example in which the user further performs the pinch-out operation for the touch UI 1904 in the state of the wrapped-display mode shown in FIG. 33A. The rendering unit 2003 renders the character-wrapped image 3301 shown in FIG. 33B based on the character size of the character-wrapped image 3301 larger than that of the character-wrapped image 3300 according to the enlargement rate of the pinch-out event. Since the character size of the character-wrapped image 3301 is larger than that of the character-wrapped image 3300, the number of characters fit into one row decreases. Consequently, the character-wrapped image 3301 does not fit into the height of the screen of the touch UI 1904, and thus, the slide bar 3302 is displayed as described above. As shown in FIG. 33B, the slide bar 3302 is arranged in a direction perpendicular to the typesetting direction of characters in an object displayed in the wrapped-display mode. Specifically, when the typesetting direction of characters is horizontal, a slide bar which can be swiped in the vertical direction is arranged on the screen of the touch UI 1904.

Figure 35A:
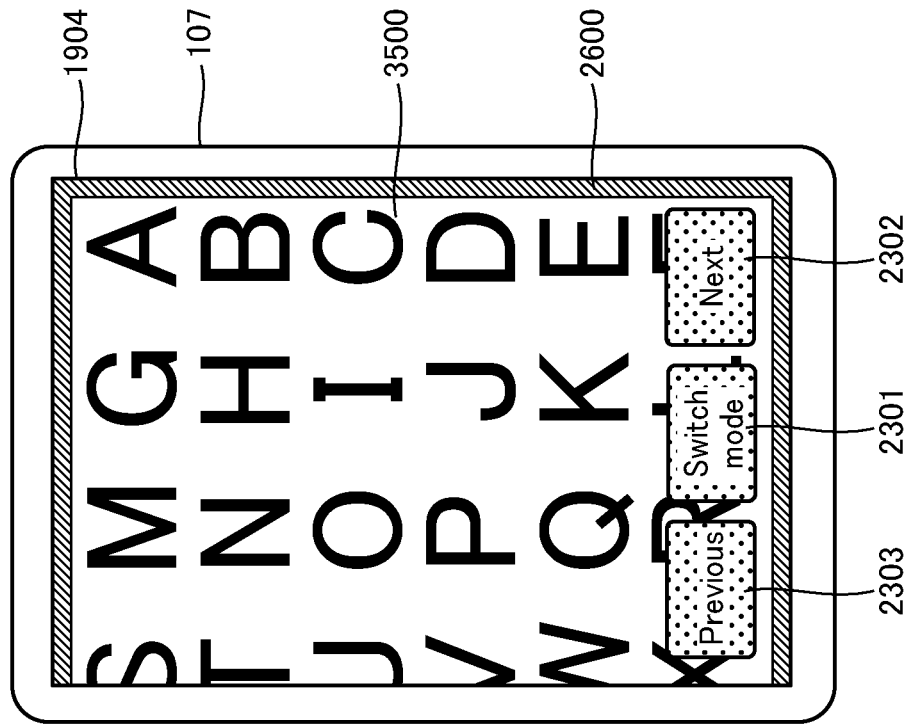
FIGS. 35A and 35B illustrate examples of screen display of the touch UI of the mobile terminal.
Figure 35B:
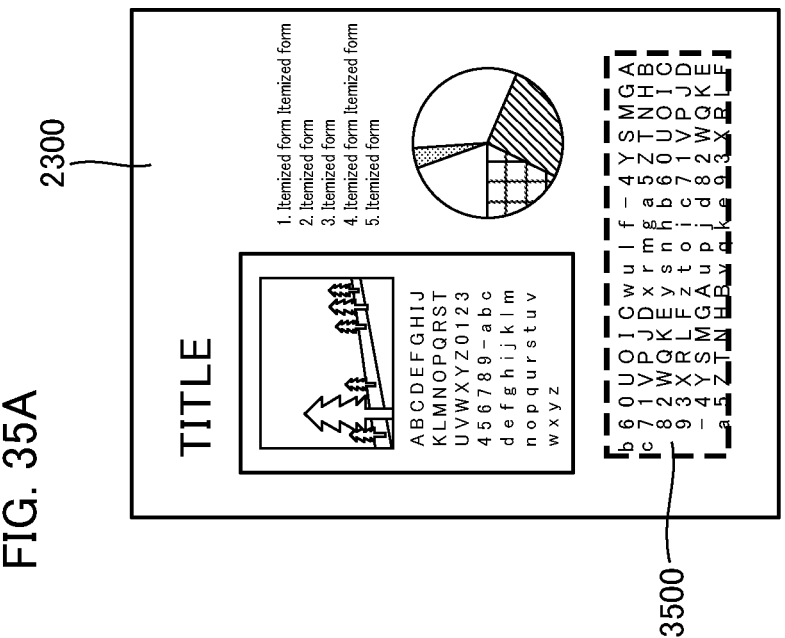

FIGS. 35A and 35B illustrate a page containing an object 3500 having the character attribute for vertical writing. The object 3500 has region information enclosed by the broken line shown in FIG. 35A. Since the object 3500 has the character attribute, immediately after the object 3500 is read in the partial region display mode, the display magnification of the page is set to a magnification with which the height of the relevant object fits into the screen height of the touch UI 1904 in the partial region display range determination processing. In the case of the object 3500, the width of the relevant object is larger than the width of the screen of the touch UI 1904 with the set display magnification of the page. Thus, the starting point of the page is set such that the top right corner of the relevant object is aligned with the top right corner of the touch UI 1904 and the page is displayed as shown in FIG. 35B. As described above, the user required operation for following characters is defined in one direction by performing the partial region display range determination processing.

Figure 36A:
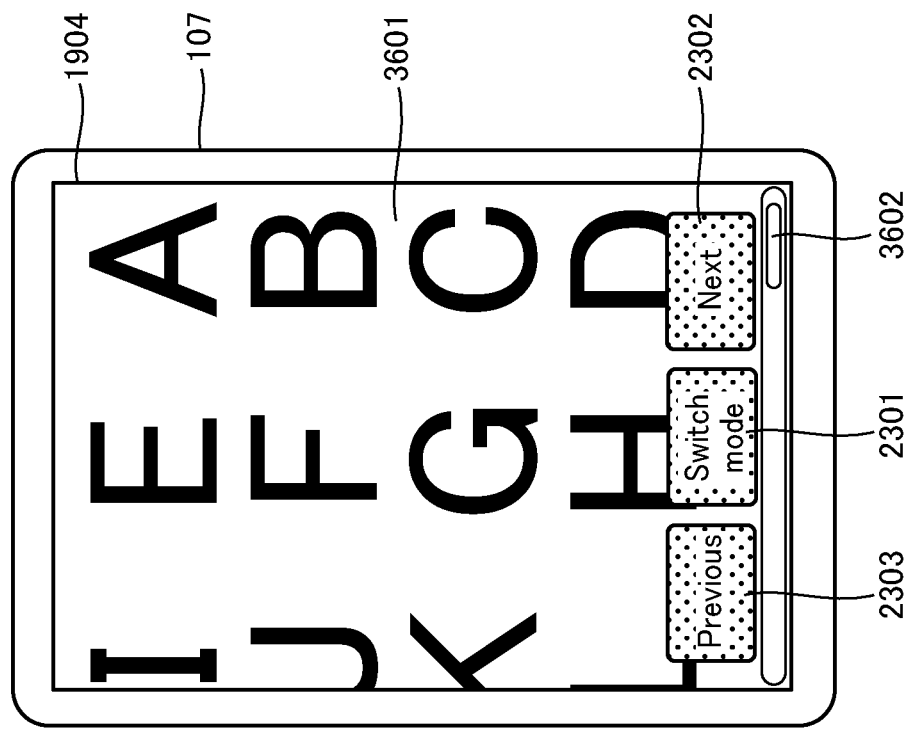
FIGS. 36A and 36B illustrate examples of screen display of the touch UI of the mobile terminal.
Figure 36B:
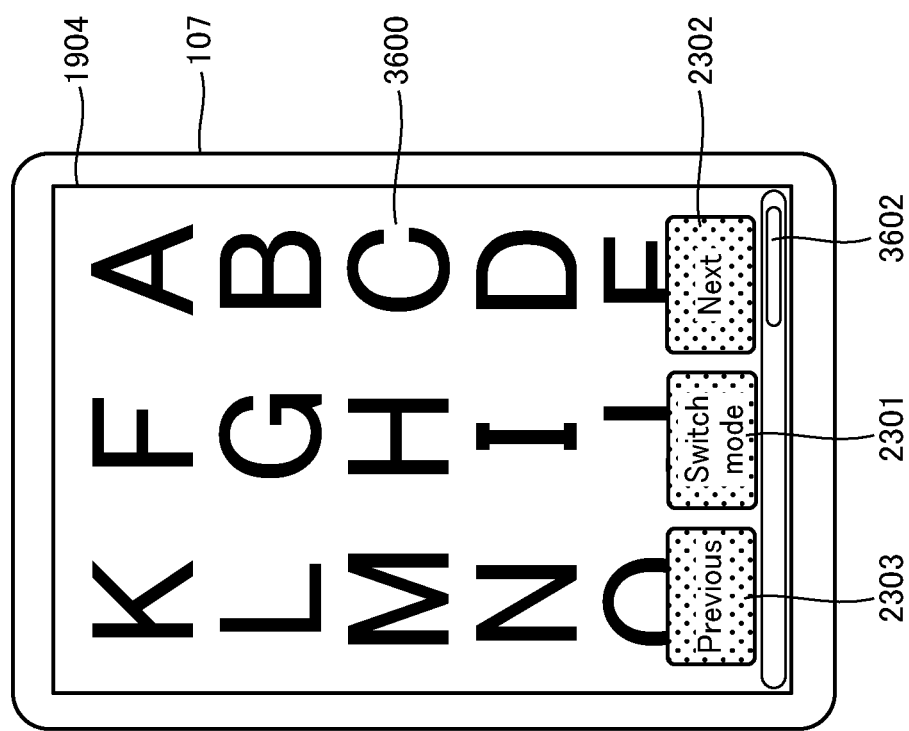

FIGS. 36A and 36B illustrate examples of screen display of the object 3500 in the wrapped-display mode, where a character-wrapped image 3600 is displayed on the screen of the touch UI 1904. In FIG. 35B, the object 3500 is highlighted in the partial region display mode. When the user performs the pinch-out operation for the touch UI 1904 in this state, the enlargement-time display mode switch processing is executed. When the typesetting direction of characters in the object 3500 is vertical and the height of the relevant object which is changed according to the enlargement rate of the pinch-out event is larger than the height of the screen of the touch UI 1904, the display mode shifts to the wrapped-display mode shown in FIG. 36A.

The character-wrapped image 3600 shown in FIG. 36A does not fit into the width of the screen of the touch UI 1904, and thus, a slide bar 3602 is displayed on the screen. The typesetting direction of characters in the object 3500 is vertical, and thus, the slide bar 3602 which can be swiped in the horizontal direction is arranged on the screen of the touch UI 1904. FIG. 36B illustrates an example in which the user further performs the pinch-out operation for the touch UI 1904 in the state of the wrapped-display mode shown in FIG. 36A. The rendering unit 2003 renders the character-wrapped image 3601 shown in FIG. 36B based on the character size of the character-wrapped image 3601 larger than that of the character-wrapped image 3600 according to the enlargement rate of the pinch-out event.

In the present embodiment, the MFP 100 transmits the application image data to be displayed to the mobile terminal 107, and the mobile terminal 107 displays the received application image data. However, it goes without saying that the MFP 100 may also be configured to generate an application which can be executed by the mobile terminal 107 storing the application image data therein and distribute the application to the mobile terminal 107. Note that the application which can be executed by the mobile terminal 107 includes the gesture event processing unit 2002, which is the software module described in the present embodiment, therein to thereby control the application image data.

Furthermore, the MFP 100 may transmit the generated application image data to the document management server 106, and transmit an address indicating the location of the application image data to the mobile terminal 107. In this case, the mobile terminal 107 does not have the entity of the application image data, but acquires, as required, page and object information from the database 105 that stores the data and provided in the document management server 106 via the LAN 102 and displays the information.

While the mobile terminal 107 of the present embodiment generates a character-wrapped image to be displayed on the screen of the touch UI 1904 in the wrapped-display mode by using the character code data contained in the application image data, the present invention is not limited thereto. The character-wrapped image may be any as long as characters can be repositioned thereon on a character-by-character basis. For example, the character-wrapped image may also be generated by detecting the rows and columns of characters from the bitmap image data and then repositioning the characters so as to fit into the size of the screen in the typesetting direction in the state of bitmap consisting of pixels. When the character-wrapped image is an object having the "character" attribute, which is described by vector data separable on a character-by-character basis, the character-wrapped image may also be subject to rendering on a character-by-character basis so as to fit into the size of the screen in the typesetting direction.

As described above, according to the present embodiment, the user can read an object having the "character" attribute with any display magnification by the movement operation in only one direction upon reading characters by the user's enlargement instruction, resulting in an improvement in user's operability. In addition, when the size of an object having the "character" attribute does not fit into the screen with respect to the typesetting direction of characters, the display apparatus automatically switches the display mode to the wrapped-display mode for allowing a user to read characters by the movement operation in only one direction, so that the user can maintain the operation in one direction without user awareness. Furthermore, when the display magnification of the object becomes large enough to be fit into the screen in the typesetting direction, the display mode is automatically switched to the partial region display mode. Thus, characters can be viewed with a layout conforming to the original document without breaking the arrangement of objects and characters to a page.

Second Embodiment

In the second embodiment, when the character-wrapped image is displayed on the screen of the touch UI 1904 in the wrapped-display mode, the character-wrapped image is displayed by superimposing it onto the page and the semi-transparent mask subjected to rendering. Since the method for displaying an image in the wrapped-display mode is only partially different from the method in the first embodiment, the same reference numerals denote the same portions as those in the first embodiment and only a different portion different from the first embodiment will be described below.

Figure 37A:
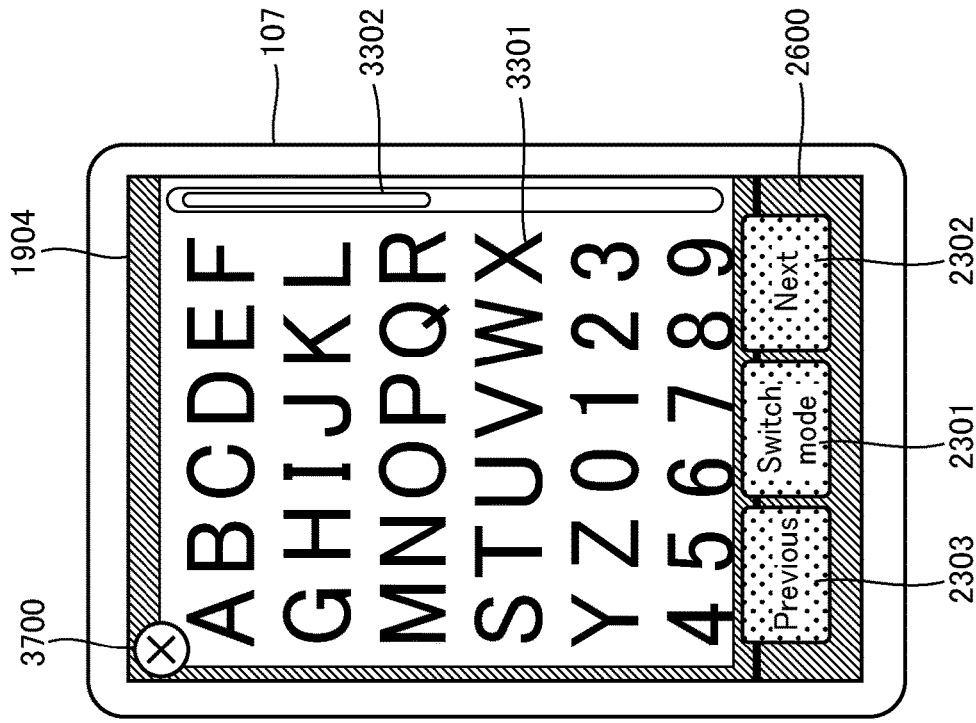
FIGS. 37A and 37B illustrate examples of screen display of the touch UI of the mobile terminal.
Figure 37B:
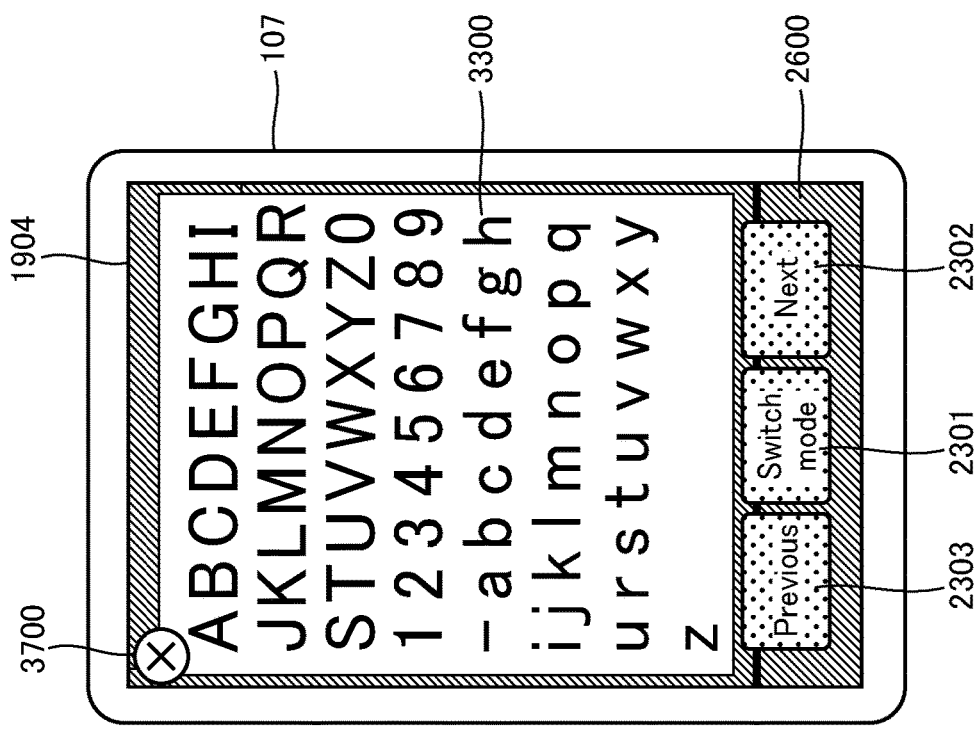

FIGS. 37A and 37B illustrate examples of screen display of the touch UI 1904 of the mobile terminal 107 in the wrapped-display mode according to the second embodiment, which is different from examples of screen display (FIGS. 33A and 33B) according to the first embodiment in that the page and the semi-transparent mask are displayed on the background of the character-wrapped image.

Figure 34:
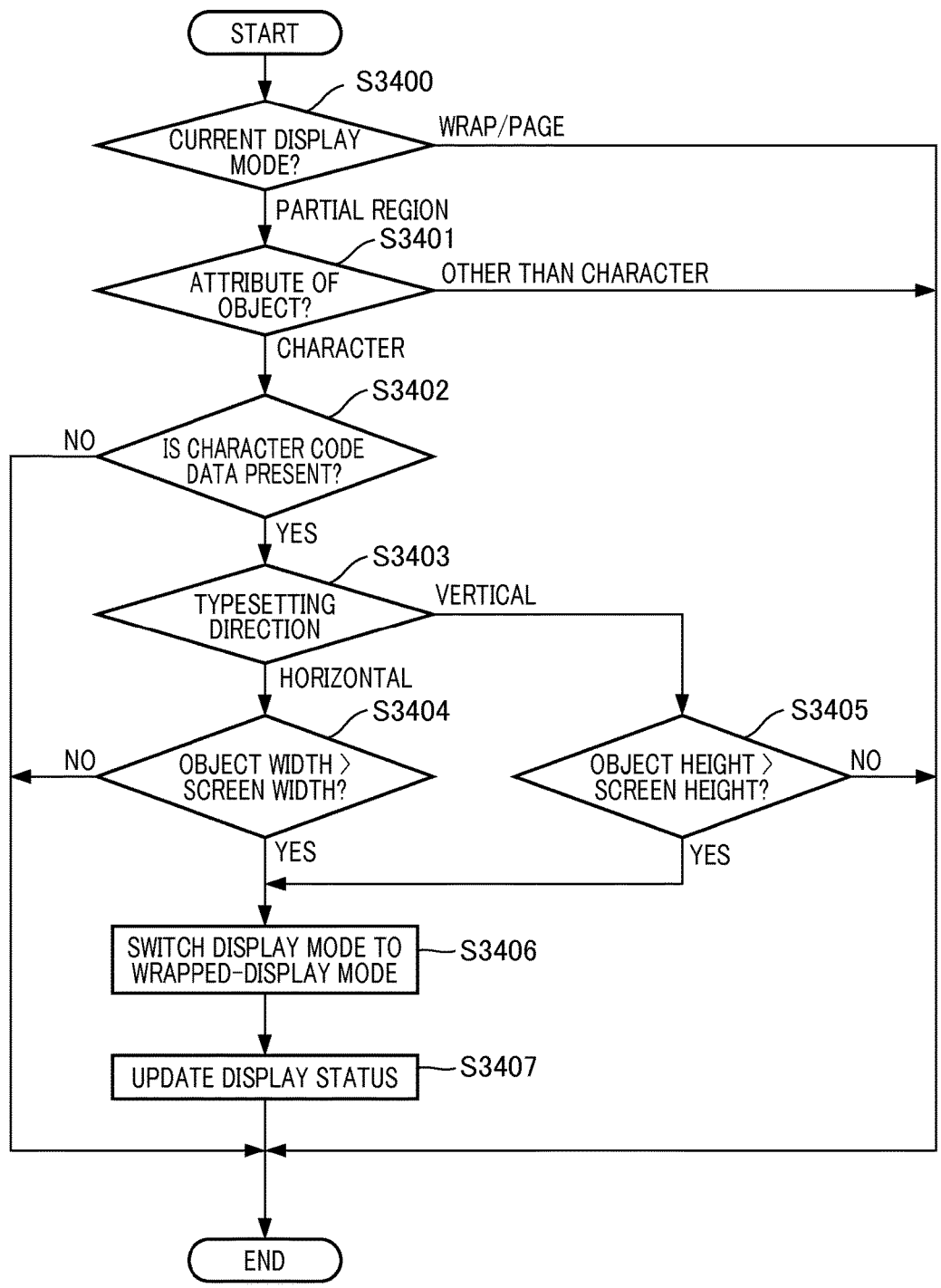
FIG. 34 is a flowchart illustrating enlargement-time display mode switch processing according to a first embodiment.

In the present embodiment, when the user performs pinch-out operation for the touch UI 1904 from the status of the object 2601 shown in FIG. 26B, the enlargement-time display mode switch processing described with reference to FIG. 34 is executed. When the typesetting direction of characters in the object 2601 is horizontal writing and the width of the relevant object which is changed according to the enlargement rate of the pinch-out event is larger than the width of the screen of the touch UI 1904 as described above, the display mode shifts to the wrapped-display mode shown in FIG. 37A. In the wrapped-display mode of the present embodiment, the rendering unit 2003 displays the character-wrapped image 3300 by superimposing it on the page 2300 and the semi-transparent mask 2600 which are displayed on the screen of the touch UI 1904 in the partial region display mode.

FIG. 37B illustrates an example in which the user further performs the pinch-out operation for the touch UI 1904 in the state of the wrapped-display mode shown in FIG. 37A, where the character-wrapped image 3301 subjected to rendering at a character size larger than that of the character-wrapped image 3300 is displayed. As in the first embodiment, the character-wrapped image 3301 does not fit into the height of the screen of the touch UI 1904, and thus, the slide bar 3302 is arranged in a direction perpendicular to the typesetting direction of characters in the object. When the typesetting direction of characters in the object is vertical, the rendering unit 2003 generates a character-wrapped image in vertical writing as in the first embodiment. As in FIG. 37A, the rendering unit 2003 displays a character-wrapped image by superimposing it onto the page 2300 and the semi-transparent mask 2600. When the character-wrapped image does not fit into the width of the screen, a slide bar which can be swiped in the horizontal direction is arranged on the screen.

In the present embodiment, the rendering unit 2003 displays a character-wrapped image by superimposing it onto the page 2300 and the semi-transparent mask 2600. Thus, a button 3700 for terminating the wrapped-display mode and switching the display mode to the partial region display mode is displayed on the screen. When the touch coordinates of the received single-tap event are on the button 3700 shown in FIG. 37A, the display change event processing unit 2400 shown in FIG. 24 sets not to display the character-wrapped image, and switches the display mode to the partial region display mode. Since the page and the semi-transparent mask remain to be displayed in the wrapped-display mode of the present embodiment, displaying a page and a semi-transparent mask is not performed in the "NEXT selection processing" in step S2810 and the reduction-time display mode switch processing in step S3110. Furthermore, in the enlargement-time display mode switch processing in step S3406, the enlargement-time display mode switching unit 2407 does not set not to display the page and the semi-transparent mask.

While, in the wrapped-display mode of the present embodiment, the character-wrapped images 3300 and 3301 are opaquely superimposed onto the page 2300, the present invention is not limited thereto. For example, it goes without saying that the character-wrapped image may also be displayed by superimposing it onto the page 2300 by making the background color of the character-wrapped image semi-transparent. At this time, it is preferable that the background color of the character-wrapped image sets to a sufficiently low transmittance in order to ensure the readability of characters.

As described above, according to the present embodiment, the user can read characters with any display magnification by the movement operation in only one direction without user awareness and can also view a part of a page displayed on the background of the character-wrapped image. Thus, the user can operate and view a text while always remaining conscious of a page layout which is very important for the text. Furthermore, since the user can view the screen displayed in the partial region display mode on the background of the character-wrapped image, the user can understand whether or not the image is currently displayed in the wrapped-display mode at a glance, resulting in prevention of occurrence of a misoperation.

Third Embodiment

In the third embodiment, when the "NEXT" button 2302 and the "PREVIOUS" button 2303 are tapped (instructed) by the user in the partial region display mode, the operation is switched according to the currently displayed partial region of the object. Since the "NEXT selection processing" and the "NEXT selection processing" are only partially different from those in the first embodiment, the same reference numerals denote the same portions as those in the first embodiment and only a different portion different from the first embodiment will be described below.

Figure 38:
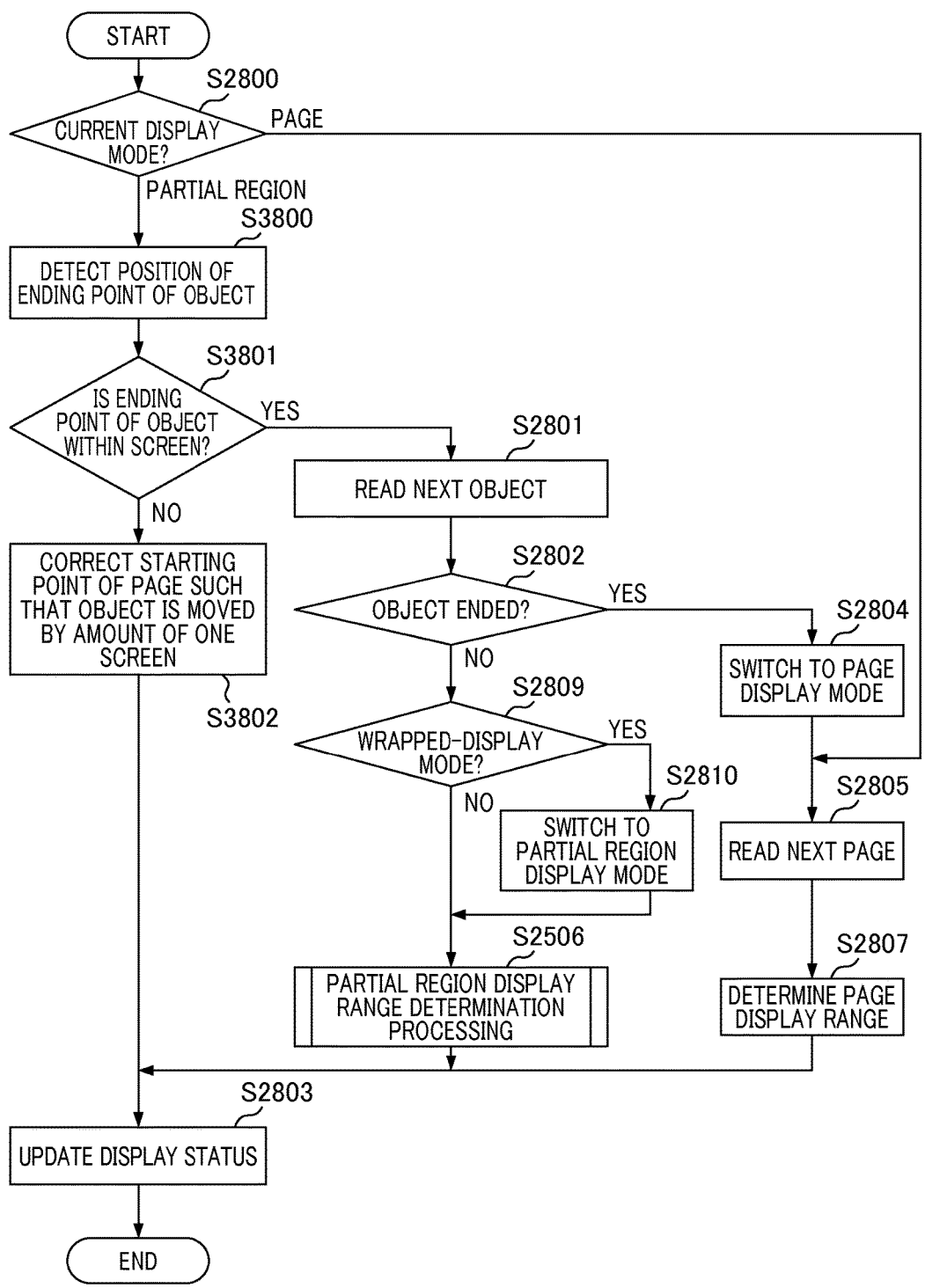
FIG. 38 is a flowchart illustrating NEXT selection processing according to a third embodiment.

In the present embodiment, a description will be given of the "NEXT selection processing ("NEXT" button selection processing)" executed when the "NEXT" button 2302 is tapped (instructed) by the user with reference to the flowchart shown in FIG. 38. Since the "NEXT" button selection processing is substantially the same as that in the first embodiment (FIG. 28), a description will be given only of steps S3800, S3801, and S3802 which are different from the first embodiment.

When the current display mode is the partial region display mode, in step S3800, the display range control unit 2403 calculates the position of the ending point of the currently read object relative to the screen of the touch UI 1904. The ending point of the object according to the present embodiment depends on the attribute of the object and the typesetting direction of characters. For example, when the attribute of the object is character and the typesetting direction of characters is horizontal, the ending point of the object is located on the lower right corner, whereas when the attribute of the object is character and the typesetting direction of characters is vertical, the ending point of the object is located on the lower left corner. When the attribute of the object is table, the ending point of the object is located at a position diagonal to the header obtained by the partial region display range determination processing. Furthermore, in the present embodiment, when the attribute of the object is other than those described above, the ending point of the object is uniquely located on the lower right corner.

In step S3801, the display range control unit 2403 determines whether or not the position of the ending point of the object is within the screen of the touch UI 1904. When the position of the ending point of the object is within the screen as a result of determination, the processing proceeds to step S2801 and the next object is read. When the position of the ending point of the object is not within the screen, that is, when the ending point of the object has not yet been completely displayed, the processing proceeds to step S3802.

In step S3802, the display range control unit 2403 sets the starting point of the page 2300 such that the region to be displayed subsequent to the currently read object is displayed within the screen. When the attribute of the object is character, the region is firstly a region which is not displayed with respect to the typesetting direction of characters and secondary a region in a row direction perpendicular to the typesetting direction of characters.

Depending on the attribute of the relevant object, in step S3801, the processing may proceed to step S2801 without performing the processing in step S3802 so as to read the next object. For example, it goes without saying that the processing may also be controlled to proceed to step S3802 only when the attribute of the relevant object is character. In the "NEXT selection processing" in the present embodiment, the processing in steps S2806 and S2808 in the first embodiment (FIG. 28) is not performed and the processing is controlled to display the last page when the currently read page is the last page. However, the present invention is not limited to such embodiment. It goes without saying that the processing in steps S2806 and S2808 may also be performed as in the first embodiment (FIG. 28).

Figure 39:
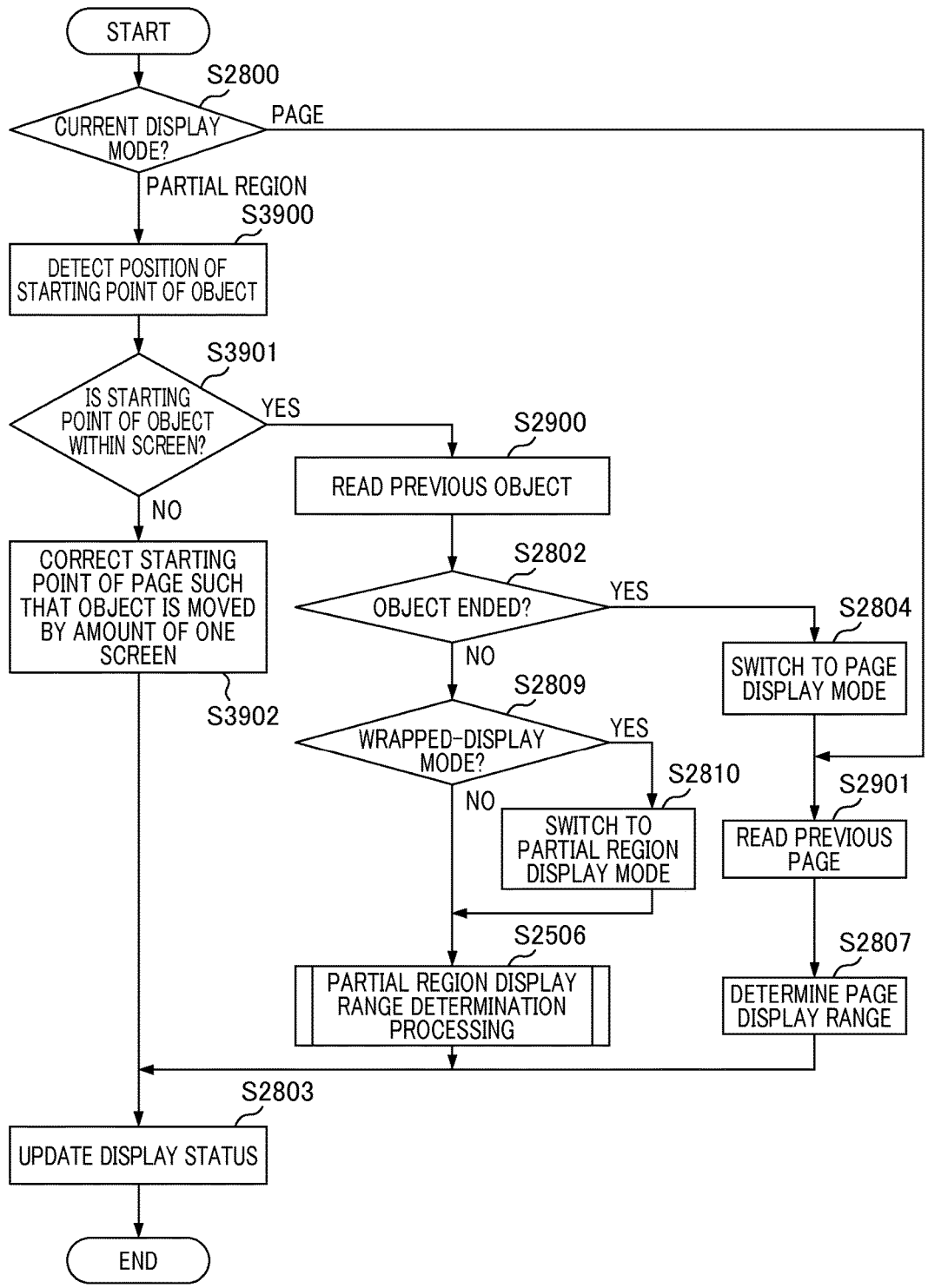
FIG. 39 is a flowchart illustrating PREVIOUS selection processing according to the third embodiment.

In the present embodiment, a description will be given of the "PREVIOUS selection processing ("PREVIOUS" button selection processing)" executed when the "PREVIOUS" button 2303 is tapped (instructed) by the user with reference to the flowchart shown in FIG. 39. Since the "PREVIOUS" button selection processing is substantially the same as that in the first embodiment (FIG. 29), a description will be given only of steps S3900, S3901, and S3902 which are different from the first embodiment.

When the current display mode is the partial region display mode, in step S3900, the display range control unit 2403 calculates the position of the starting point of the currently read object relative to the screen of the touch UI 1904. The starting point of the object according to the present embodiment depends on the attribute of the object and the typesetting direction of characters. For example, when the attribute of the object is character and the typesetting direction of characters is horizontal, the starting point of the object is located on the upper left corner, whereas when the attribute of the object is character and the typesetting direction of characters is vertical, the starting point of the object is located on the upper right corner. When the attribute of the object is table, the starting point of the object is located at a header position obtained by the partial region display range determination processing. Furthermore, in the present embodiment, when the attribute of the object is other than those described above, the starting point of the object is uniquely located on the lower left corner.

In step S3901, the display range control unit 2403 determines whether or not the position of the starting point of the object is within the screen of the touch UI 1904. When the position of the starting point of the object is within the screen as a result of determination, the processing proceeds to step S2900 and the previous object is read. When the position of the starting point of the object is not within the screen, that is, when the starting point of the object has not yet been completely displayed, the processing proceeds to step S3902.

In step S3902, the display range control unit 2403 sets the starting point of the page 2300 such that the region containing the starting point of the currently read object is displayed within the screen. When the attribute of the object is character, the region is firstly a region which is not displayed with respect to the typesetting direction of characters and secondary a region in a row direction perpendicular to the typesetting direction of characters.

Depending on the attribute of the relevant object, in step S3901, the processing may proceed to step S2900 without performing the processing in step S3902 so as to read the previous object. For example, it goes without saying that the processing may also be controlled to proceed to step S3902 only when the attribute of the relevant object is character. In the "PREVIOUS selection processing" in the present embodiment, the processing in steps S2806 and S2902 in the first embodiment (FIG. 29) is not performed and the processing is controlled to display the first page when the currently read page is the first page. However, the present invention is not limited to such embodiment. It goes without saying that the processing in steps S2806 and S2902 may also be performed as in the first embodiment (FIG. 29).

As described above, according to the present embodiment, the user can read characters with any display magnification by the movement operation in only one direction without user awareness and can also read characters only by a button operation in the partial region display mode.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-276168 filed on Dec. 18, 2012, which is hereby incorporated by reference herein in its entirety.

What is claimed is:

1. A display apparatus constructed to enlarge an input image including a plurality of objects which contain at least a character object whose attribute is character and an image object whose attribute is image and constructed to display, on a screen, a display range that is part of the enlarged input image and includes a main object that is one of the plurality of objects included in the input image, the display apparatus comprising:
    a receiving unit configured to receive an instruction from a user to change a display magnification of the display range that includes the main object which has been displayed on the screen; and
    a display control unit configured to perform control to a display, such that the main object is displayed in a first enlargement rate decided based on a size of the main object and the screen size when enlarging the display responding to an instruction from the user received via the receiving unit,
    wherein the display control unit further configured to perform control to the display, when receiving an instruction to enlarge the main object in an enlargement rate larger than the first enlarging rate, such that:
    the main object is enlarged in the first enlargement rate if the displayed main object is the image object, and
    the main object is enlarged in a second enlargement rate which is larger than the first enlargement rate, and one or more characters, which belonging in the first line being constituted in the main object before being enlarged but not fitting into the wide of the screen after being enlarged, are moved to a second line following to the first line in the main object, if the displayed object is the character object.

2. The display apparatus according to claim 1, wherein, in a case that the main object corresponding to a received instruction to enlarge and display from the receiving unit is not a character object, the display unit displays the main object enlarged by the first enlargement rate.

3. The display apparatus according to claim 1, wherein, in a case that the receiving unit receives an instruction to reduce and display the main object, the display control unit reduces the main object which has been enlarged and displayed so that the width of the main object fits into the width of the screen and displays the input image that includes a plurality of objects.

4. The display apparatus according to claim 1, wherein, in a case that the receiving unit receives an instruction to enlarge and display the character object and the width of the enlarged character object is wider than the width of the screen, the display control unit displays the character object wrapped in the screen.

5. The display apparatus according to claim 1, wherein, in a case that the receiving unit receives an instruction to reduce and display the main object and the width of the reduced main object is not wider than the width of the screen, the display control unit displays the whole input image that includes a plurality of objects.

6. The display apparatus according to claim 1, wherein the receiving unit receives the instruction by the user touching the screen.

7. A method for controlling a display apparatus constructed to enlarge an input image including a plurality of objects which contain at least a character object whose attribute is character and an image object whose attribute is image and constructed to display, on a screen, a display range that is part of the enlarged input image and includes a main object that is one of the plurality of objects included in the input image, the method comprising:

receiving an instruction from a user to change a display magnification of the display range that includes the main object which has been displayed on the screen; and performing control to a display, such that the main object is displayed in a first enlargement rate decided based on a size of the main object and the screen size when enlarging the display responding to an instruction from the user received via the receiving unit, wherein the method further performing control to the display, when receiving an instruction to enlarge the main object in an enlargement rate larger than the first enlarging rate, such that:

the main object is enlarged in the first enlargement rate if the displayed main object is the image object, and the main object is enlarged in a second enlargement rate which is larger than the first enlargement rate, and one or more characters, which belonging in the first line being constituted in the main object before being enlarged but not fitting into the wide of the screen after being enlarged, are moved to a second line following to the first line in the main object, if the displayed object is the character object.

8. A non-transitory computer-readable storage medium storing a computer program for making a processor to execute a control method of a display apparatus constructed to enlarge an input image including a plurality of objects which contain at least a character object whose attribute is character and an image object whose attribute is image and constructed to display, on a screen, a display range that is part of the enlarged input image and includes a main object that is one of the plurality of objects included in the input image, the method comprising:

receiving an instruction from a user to change a display magnification of the display range that includes the main object which has been displayed on the screen; and performing control to a display, such that the main object is displayed in a first enlargement rate decided based on a size of the main object and the screen size when enlarging the display responding to an instruction from the user received via the receiving unit, wherein the method further performing control to the display, when receiving an instruction to enlarge the main object in an enlargement rate larger than the first enlarging rate, such that:

the main object is enlarged in the first enlargement rate if the displayed main object is the image object, and the main object is enlarged in a second enlargement rate which is larger than the first enlargement rate, and one or more characters, which belonging in the first line being constituted in the main object before being enlarged but not fitting into the wide of the screen after being enlarged, are moved to a second line following to the first line in the main object, if the displayed object is the character object.

* * * * *